US012811297B2

(12) United States Patent
Choi et al.

(10) Patent No.: US 12,811,297 B2
(45) Date of Patent: Nov. 24, 2026

(54) ELECTRONIC DEVICE COMPRISING ANTENNA

(71) Applicant: SAMSUNG ELECTRONICS CO., LTD., Suwon-si (KR)

(72) Inventors: Sanghoon Choi, Suwon-si (KR); Youngjung Kim, Suwon-si (KR); Jonghoon Kim, Suwon-si (KR); Dongjun Oh, Suwon-si (KR); Himchan Yun, Suwon-si (KR); Youngsung Lee, Suwon-si (KR); Aro Cheon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

(21) Appl. No.: 18/903,650

(22) Filed: Oct. 1, 2024

(65) Prior Publication Data

US 2025/0105517 A1 Mar. 27, 2025

Related U.S. Application Data

(63) Continuation of application No. PCT/KR2024/013356, filed on Sep. 4, 2024.

(30) Foreign Application Priority Data

Sep. 21, 2023 (KR) ........................ 10-2023-0126641
Nov. 2, 2023 (KR) ........................ 10-2023-0150359

(51) Int. Cl.
*H01Q 1/50* (2006.01)
*H01Q 5/50* (2015.01)

(52) U.S. Cl.
CPC ................ *H01Q 5/50* (2015.01); *H01Q 1/50* (2013.01)

(58) Field of Classification Search
CPC ............. H01Q 5/50; H01Q 1/50; H01Q 1/48; H01Q 5/35; H01Q 9/42; H01Q 21/28;
(Continued)

(56) References Cited

U.S. PATENT DOCUMENTS 8,054,231 B2 11/2011 Ahn et al.
8,462,056 B2 6/2013 Byun et al.
(Continued)

FOREIGN PATENT DOCUMENTS

CN 108963439 A 12/2018
CN 111262016 A 6/2020
(Continued)

OTHER PUBLICATIONS

Chattha, Hassan Tariq et al., "PIFA Bandwidth Enhancement by Changing the Widths of Feed and Shorting Plates", IEEE Antennas and Wireless Propagation Letters, vol. 8, 2009, pp. 637-640. (4 pages total).

(Continued)

*Primary Examiner* — Michael M Bouizza
(74) *Attorney, Agent, or Firm* — Sughrue Mion, PLLC

(57) ABSTRACT

An electronic device includes: a conductive portion; a printed circuit board having a first ground path, a second ground path, and a feed path; and a wireless communication circuit on the printed circuit board. The conductive portion includes a feed point, a first ground point, and a second ground point. The first ground point is connected to a ground of the electronic device through the first ground path. The second ground point is connected to the ground through the second ground path. The feed point is electrically connected to the wireless communication circuit through the feed path. The printed circuit board includes a conductive pattern connected between the feed path and the first ground path. The wireless communication circuit is configured to supply (Continued)

a signal, through the feed path, to the conductive portion and the conductive pattern. The signal is radiated through the conductive portion and the conductive pattern.

20 Claims, 28 Drawing Sheets

(58) Field of Classification Search
CPC ............ H01Q 1/243; H01Q 1/24; H01Q 1/38; H01Q 5/335; H01Q 9/06; H04M 1/02; H05K 1/02
See application file for complete search history.

(56) References Cited

U.S. PATENT DOCUMENTS

| | | | | |
|---|---|---|---|---|
| 9,450,291 | B2 | 9/2016 | Korva et al. | |
| 9,813,532 | B2 | 11/2017 | Kim et al. | |
| 10,594,344 | B2 | 3/2020 | Son et al. | |
| 10,886,614 | B2 | 1/2021 | Lee et al. | |
| 2017/0033440 | A1 | 2/2017 | Kim et al. | |
| 2019/0393586 | A1 | 12/2019 | Hu et al. | |
| 2020/0136243 | A1 | 4/2020 | Shin et al. | |
| 2021/0135351 | A1 | 5/2021 | Son et al. | |
| 2022/0223998 | A1* | 7/2022 | Jang | H01Q 5/328 |
| 2023/0046925 | A1* | 2/2023 | Jang | H01Q 9/42 |
| 2024/0222850 | A1 | 7/2024 | Oh et al. | |
| 2025/0030149 | A1* | 1/2025 | Jeon | H01Q 1/2283 |
| 2025/0286268 | A1 | 9/2025 | Oh et al. | |

FOREIGN PATENT DOCUMENTS

| | | | |
|---|---|---|---|
| KR | 10-1501921 | B1 | 3/2015 |
| KR | 10-1558648 | B1 | 10/2015 |
| KR | 10-1700744 | B1 | 2/2017 |
| KR | 10-2020-0046246 | A | 5/2020 |
| KR | 10-2020-0100986 | A | 8/2020 |
| KR | 10-2021-0054262 | A | 5/2021 |
| KR | 10-2429230 | B1 | 8/2022 |
| KR | 10-2618860 | B1 | 12/2023 |

OTHER PUBLICATIONS

International Search Report (PCT/ISA/210) and Written Opinion (PCT/ISA/237) issued Dec. 26, 2024 by the International Searching Authority in International Application No. PCT/KR2024/013356.

Extended European Search Report dated Oct. 7, 2026, issued by the European Patent Office in European Application No. 24868539.8.

* cited by examiner

| EXAMPLE | [A] | [A'] | [B] | [B'] | [C] |
|---|---|---|---|---|---|
| 2002 | O | | O | | |
| 2004 | O | | | O | |
| 2006 | | O | O | | |
| 2008 | | O | | O | |
| 2010 | O | | O | | O |
| 2012 | O | | | O | O |
| 2014 | | O | O | | O |
| 2016 | | O | | O | O |
| 2018 | O | O | O | O | O |

ELECTRONIC DEVICE COMPRISING ANTENNA

CROSS-REFERENCE TO RELATED APPLICATIONS

This application is a continuation application, claiming priority under § 365(c), of an International application No. PCT/KR2024/013356, filed on Sep. 4, 2024, which is based on and claims the benefit of a Korean patent application number 10-2023-0126641, filed on Sep. 21, 2023, in the Korean Intellectual Property Office, and of a Korean patent application number 10-2023-0150359, filed on Nov. 2, 2023, in the Korean Intellectual Property Office, the disclosure of each of which is incorporated by reference herein in its entirety.

BACKGROUND

1. Field

The disclosure relates to an electronic device comprising an antenna.

2. Description of Related Art

An electronic device, such as a smartphone, may include an antenna that enables wireless communication. The antenna of the electronic device may operate at various frequencies to support various communication standards such as 4G, 5G, and Wi-Fi.

The above-described information may be provided as a related art for the purpose of helping to understand the disclosure. No claim or determination is raised as to whether any of the above-described information can be applied as prior art related to the disclosure.

SUMMARY

According to an aspect of the disclosure, an electronic device includes: a housing including a conductive portion forming a portion of a side surface of the electronic device; a printed circuit board having a first ground path, a second ground path, and a feed path; and a wireless communication circuit on the printed circuit board, wherein the conductive portion includes a feed point, a first ground point, and a second ground point, wherein the first ground point is connected to a ground of the electronic device through the first ground path, wherein the second ground point is connected to the ground through the second ground path, wherein the feed point is electrically connected to the wireless communication circuit through the feed path, wherein the printed circuit board includes a conductive pattern connected between the feed path and the first ground path, wherein the wireless communication circuit is configured to supply a signal, through the feed path, to the conductive portion and the conductive pattern, and wherein the signal is radiated through the conductive portion and the conductive pattern.

According to an aspect of the disclosure, an electronic device includes: a conductive portion comprising a feed point, a first ground point, a second ground point, and a third ground point located in that order, the conductive portion forming a portion of a side surface of the electronic device; a printed circuit board comprising a conductive pattern; and a wireless communication circuit on the printed circuit board, the wireless communication circuit being connected to the feed point through a feed path of the printed circuit board, wherein each of the first ground point, the second ground point, and the third ground point is connected to a ground of the electronic device, wherein the first ground point is connected to the ground through a first ground path of the printed circuit board, wherein the second ground point is connected to the ground through a second ground path of the printed circuit board, wherein the conductive pattern of the printed circuit board includes: a first conductive pattern connected between the feed path and the first ground path, a second conductive pattern connected between the first ground path and the second ground path, and a stub pattern extending from the first ground path such that an end faces the feed path, wherein the wireless communication circuit is configured to supply a signal, through the feed path, to the conductive portion and the conductive pattern, and wherein the signal is radiated through the conductive portion and the conductive pattern.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
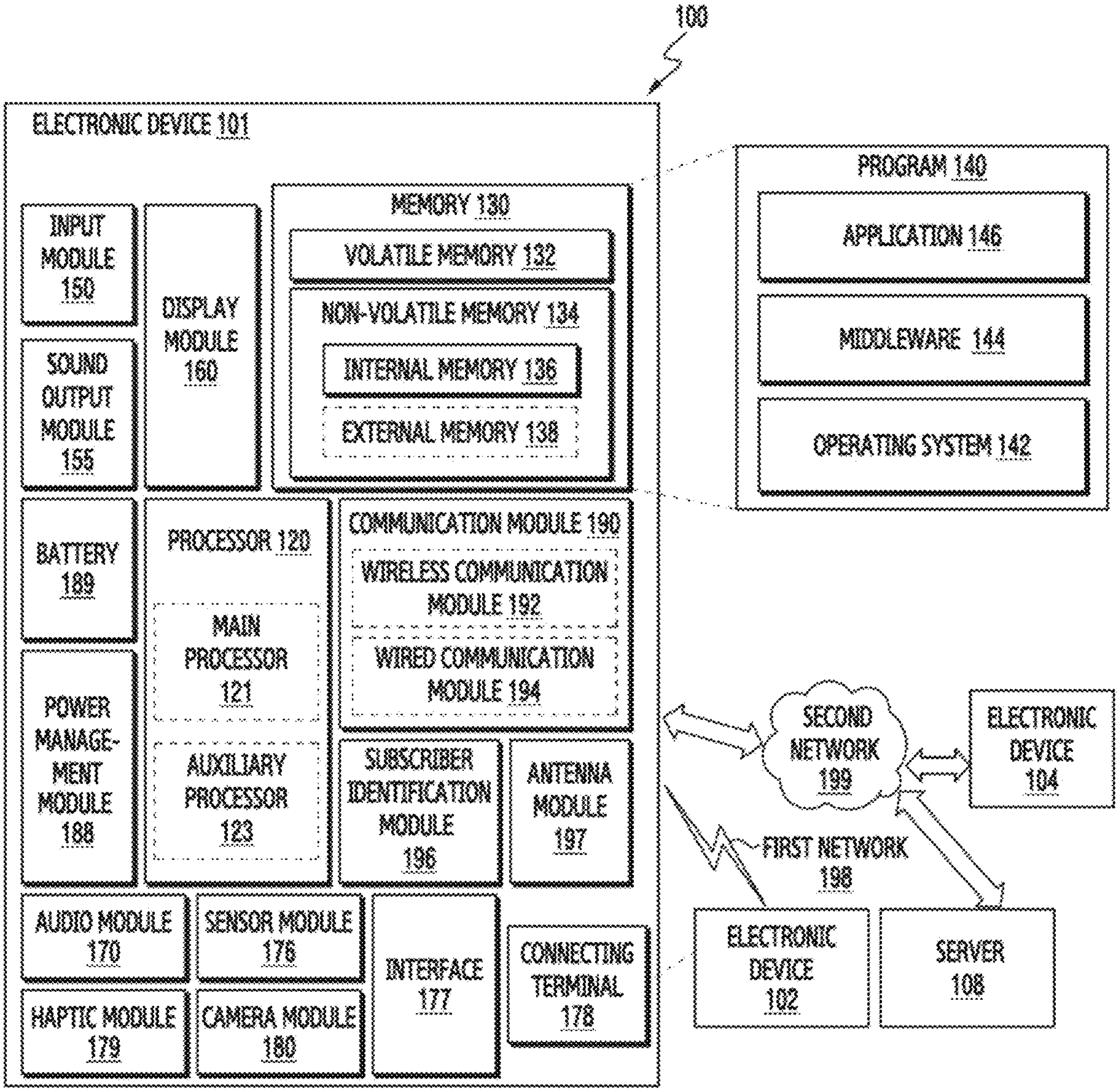
FIG. 1 illustrates an electronic device in a network environment according to various embodiments.

FIG. 1 illustrates an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
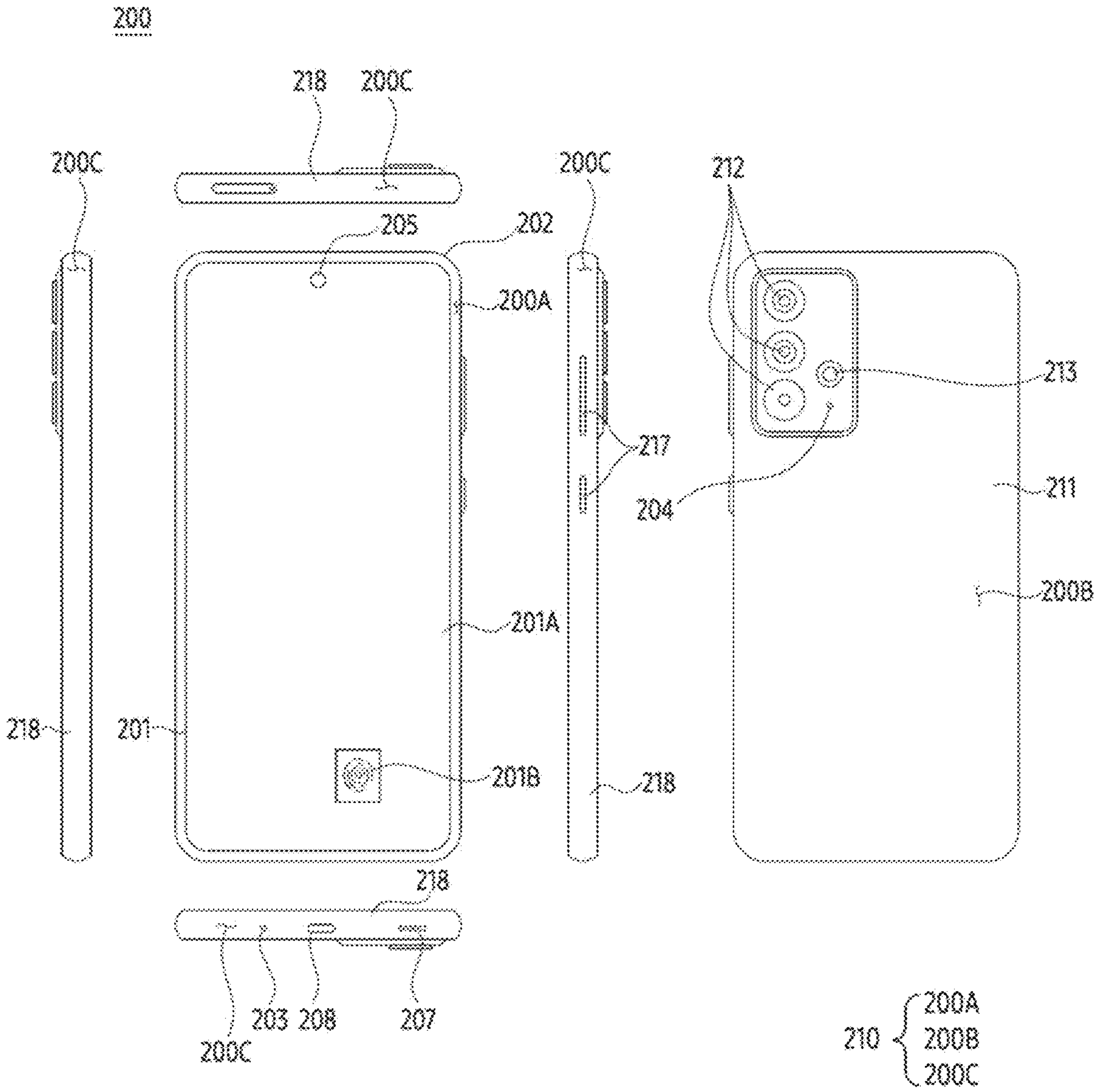
FIG. 2A illustrates an example electronic device according to an embodiment.

FIG. 2A illustrates an example electronic device according to an embodiment.

Referring to FIG. 2A, an electronic device 200 (e.g., the electronic device 101 of FIG. 1) according to an embodiment may include a housing 210 forming the exterior of the electronic device 200. For example, the housing 210 may include a first surface (or front surface) 200A, a second surface (or rear surface) 200B, and a third surface (or side surface) 200C surrounding a space between the first surface 200A and the second surface 200B. According to an embodiment, the housing 210 may refer to a structure (e.g., a frame structure 240 of FIG. 2B) forming at least a portion of the first surface 200A, the second surface 200B, and/or the third surface 200C.

The electronic device 200 according to an embodiment may include a substantially transparent front plate 202. In an embodiment, the front plate 202 may form at least a portion of the first surface 200A. In an embodiment, the front plate 202 may include, for example, a glass plate or a polymer plate including various coating layers, but is not limited thereto.

According to an embodiment, the electronic device 200 may include a substantially opaque rear plate 211. In an embodiment, the rear plate 211 may form at least a portion of the second surface 200B. In an embodiment, the rear plate 211 may be formed of coated or colored glass, ceramic, polymer, metal (e.g., aluminum, stainless steel, or magnesium), or a combination of at least two of the above materials.

Figure 2B:
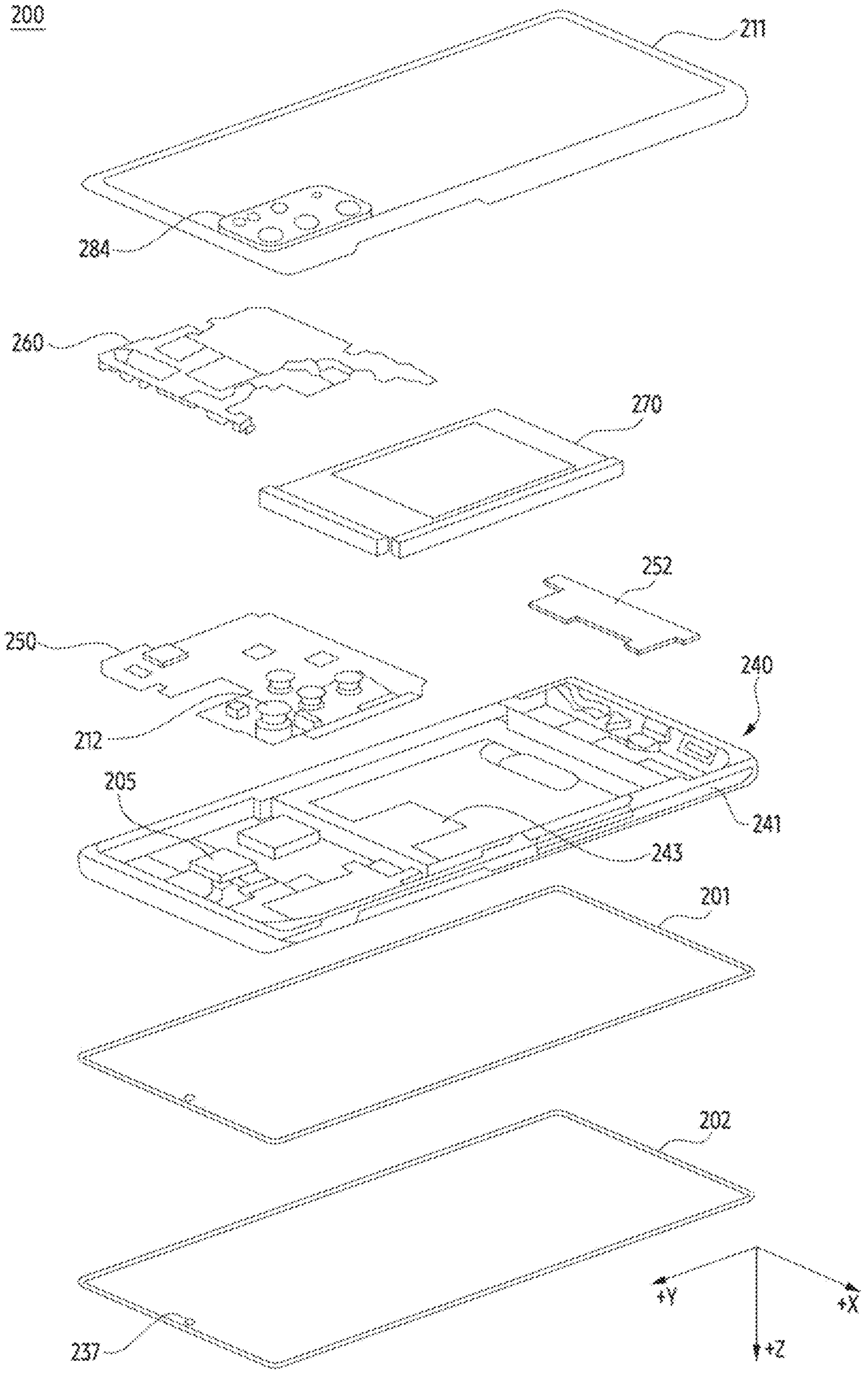
FIG. 2B is an exploded perspective view of an example electronic device according to an embodiment.

According to an embodiment, the electronic device 200 may include a side bezel structure (or a side member) 218 (e.g., a sidewall 241 of the frame structure 240 of FIG. 2B). In an embodiment, the side bezel structure 218 may be coupled to the front plate 202 and/or the rear plate 211 to form at least a portion of the third surface 200C of the electronic device 200. For example, the side bezel structure 218 may form the entire third surface 200C of the electronic device 200, and for another example, the side bezel structure 218 may form the third surface 200C of the electronic device 200 together with the front plate 202 and/or the rear plate 211.

In an embodiment, the side bezel structure 218 may include metal and/or polymer. In an embodiment, the rear plate 211 and the side bezel structure 218 may be formed integrally and may include the same material (e.g., a metallic material such as aluminum), but are not limited thereto. For example, the rear plate 211 and the side bezel structure 218 may be formed in separate configurations and/or may include different materials.

In an embodiment, the electronic device 200 may include at least one of a display 201 (e.g., the display module 160 of FIG. 1), microphone holes 203 and 204, a speaker hole 207, a sensor module (e.g., the sensor module 176 of FIG. 1), camera modules 205, 212, and 213 (e.g., the camera module 180 of FIG. 1), a key input device 217, a light emitting element, and/or a connector hole 208.

In an embodiment, the display 201 may be visually exposed through a significant portion of the front plate 202. For example, at least a portion of the display 201 may be visible through the front plate 202 forming the first surface 200A. In an embodiment, the display 201 may be disposed on a rear surface of the front plate 202.

In an embodiment, the outer shape of the display 201 may be formed to be substantially the same as the outer shape of the front plate 202 adjacent to the display 201. In an embodiment, in order to expand the extent to which the display 201 is visually exposed, an interval between an outer edge of the display 201 and an outer edge of the front plate 202 may be formed to be substantially the same.

In an embodiment, the display 201 (or the first surface 200A of the electronic device 200) may include a screen display area 201A. In an embodiment, the display 201 may provide visual information to a user through the screen display area 201A. In an illustrated embodiment, when the first surface 200A is viewed from the front, the screen display area 201A is illustrated to be spaced apart from the outer edge of the first surface 200A and located inside the first surface 200A, but it is not limited thereto. In another embodiment, when the first surface 200A is viewed from the front, at least a portion of an edge of the screen display area 201A may match substantially an edge of the first surface 200A (or the front plate 202).

In an embodiment, the screen display area 201A may include a sensing area 201B configured to obtain biometric information of a user. Herein, the meaning of "the screen display area 201A includes the sensing area 201B" may be understood that at least a portion of the sensing area 201B may be overlapped with the screen display area 201A. For example, the sensing area 201B may refer to an area capable of displaying visual information by the display 201 like another area of the screen display area 201A, and obtaining the user's biometric information (e.g., fingerprint) additionally. In another embodiment, the sensing area 201B may be formed in the key input device 217.

In an embodiment, the display 201 may include an area in which a first camera module 205 is located. In an embodiment, an opening is formed in the area of the display 201, and the first camera module 205 (e.g., a punch hole camera) may be at least partially disposed within the opening to face the first surface 200A. In this case, the screen display area 201A may surround at least a portion of an edge of the opening. In another embodiment, the first camera module 205 (e.g., an under display camera (UDC)) may be disposed under the display 201 to overlap the area of the display 201. In this case, the display 201 may provide visual information to the user through the area, and additionally, the first camera module 205 may obtain an image corresponding to a direction toward the first surface 200A through the area of the display 201.

In an embodiment, the display 201 may be combined with or disposed adjacent to a touch sensing circuit, a pressure sensor capable of measuring the intensity (pressure) of a touch, and/or a digitizer that detects a magnetic field type stylus pen.

In an embodiment, the microphone holes 203 and 204 may include a first microphone hole 203 formed in a partial area of the third surface 200C and a second microphone hole 204 formed in a partial area of the second surface 200B. A microphone for obtaining an external sound may be disposed inside the microphone holes 203 and 204. The microphone may include a plurality of microphones to detect a direction of sound.

In an embodiment, the second microphone hole 204 formed in a partial area of the second surface 200B may be disposed adjacent to the camera modules 205, 212, and 213. For example, the second microphone hole 204 may obtain sound according to operations of the camera modules 205, 212, and 213. However, it is not limited thereto.

In an embodiment, the speaker hole 207 may include an external speaker hole 207 and a receiver hole for a call. The external speaker hole 207 may be formed in a portion of the third surface 200C of the electronic device 200. In another embodiment, the external speaker hole 207 may be implemented as one hole with the first microphone hole 203. In some embodiments, the receiver hole for a call may be formed in another portion of the third surface 200C. For example, the receiver hole for a call may be formed on an opposite side of the external speaker hole 207 in the third surface 200C. For example, based on the illustration of FIG. 2A, the external speaker hole 207 may be formed on the third surface 200C corresponding to a lower end portion of the electronic device 200, and the receiver hole for a call may be formed on the third surface 200C corresponding to a upper end portion of the electronic device 200. However, it is not limited thereto, and in another embodiment, the receiver hole for a call may be formed at a position other than the third surface 200C. For example, the receiver hole for a call may be formed by a space separated between the front plate 202 (or the display 201) and the side bezel structure 218.

In an embodiment, the electronic device 200 may include at least one speaker (e.g., the sound output module 155 of FIG. 1) configured to output sound to the outside of the housing 210 through the external speaker hole 207 and/or the receiver hole for a call.

In an embodiment, the sensor module (e.g., the sensor module 176 of FIG. 1) may generate an electrical signal or a data value corresponding to an operating state inside the electronic device 200 or an external environmental state. For example, the sensor module may include at least one of a proximity sensor, a heart rate monitor (HRM) sensor, a fingerprint sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

In an embodiment, the camera modules 205, 212, and 213 may include the first camera module 205 disposed toward the first surface 200A of the electronic device 200, a second camera module 212 disposed toward the second surface 200B, and a flash 213.

In an embodiment, the second camera module 212 may include a plurality of cameras (e.g., a dual camera, a triple camera, or a quad camera). However, the second camera module 212 is not necessarily limited to including the plurality of cameras, and may include one camera.

In an embodiment, the first camera module 205 and the second camera module 212 may include one or a plurality of lenses, an image sensor, and/or an image signal processor.

In an embodiment, the flash 213 may include, for example, a light emitting diode or a xenon lamp. In another embodiment, two or more lenses (an infrared camera, a wide-angle lens, and a telephoto lens) and image sensors may be disposed on a surface of the electronic device 200.

In an embodiment, the key input device 217 (e.g., the input module 150 of FIG. 1) may be disposed on the third surface 200C of the electronic device 200. In another embodiment, the electronic device 200 may not include a portion or all of the key input devices 217, and the key input device 217 that is not included may be implemented on the display 201 in another form such as a soft key.

In an embodiment, the connector hole 208 may be formed on the third surface 200C of the electronic device 200 so that the connector of the external device may be accommodated therein. A connection terminal (e.g., the connection terminal 178 of FIG. 1) electrically connected to a connector of an external device may be disposed in the connector hole 208. The electronic device 200 according to an embodiment may include an interface module (e.g., the interface 177 of FIG. 1) for processing an electrical signal transmitted and received through the connection terminal.

According to an embodiment, the electronic device 200 may include a light emitting element. For example, the light emitting element may be disposed on the first surface 200A of the housing 210. The light emitting device may provide state information of the electronic device 200 in an optical form. In another embodiment, the light emitting element may provide a light source linked to an operation of the first camera module 205. For example, the light emitting element may include an LED, an IR LED, and/or a xenon lamp.

FIG. 2B is an exploded perspective view of an example electronic device according to an embodiment. In this document, identical reference numerals are assigned to identical components. Descriptions of components having the same reference numerals may be applied in the same manner even when referring to different illustrations, unless specifically mentioned. Hereinafter, overlapping descriptions of components having the same reference numerals may be omitted.

Referring to FIG. 2B, the electronic device 200 according to an embodiment may include the frame structure 240, a first printed circuit board 250, a second printed circuit board 252, a cover plate 260, and a battery 270 (e.g., the battery 189 of FIG. 1).

In an embodiment, the frame structure 240 may include a sidewall 241 forming the exterior (e.g., the third surface 200C of FIG. 2A) of the electronic device 200 and a support portion 243 extending inward from the sidewall 241. In an embodiment, the frame structure 240 may be disposed between the display 201 and the rear plate 211. In an embodiment, the sidewall 241 of the frame structure 240 may surround a space between the rear plate 211 and the front plate 202 (and/or the display 201), and the support portion 243 of the frame structure 240 may extend from the sidewall 241 within the space.

In an embodiment, the frame structure 240 may include a conductive portion formed of a conductive material (e.g., metal). For example, the sidewall 241 may include a conductive portion (e.g., the conductive portion 340 of FIG. 3) operating as an antenna radiator. For example, the support portion 243 may include a conductive portion. A conductive portion of the sidewall 241 may be connected to the conductive portion of the support portion 243.

In an embodiment, the frame structure 240 may support or accommodate other components included in the electronic device 200. For example, the display 201 may be disposed on a surface of the frame structure 240 facing a direction (e.g., +z direction), and the display 201 may be supported by the support portion 243 of the frame structure 240. For example, the first printed circuit board 250, the second printed circuit board 252, the battery 270, and the second camera module 212 may be disposed on another surface facing an opposite direction (e.g., −z direction) to the direction of the frame structure 240. The first printed circuit board 250, the second printed circuit board 252, the battery 270 and the second camera module 212 may be seated in a recess defined by the sidewall 241 and/or the support portion 243 of the frame structure 240.

In an embodiment, the first printed circuit board 250, the second printed circuit board 252, and the battery 270 may be coupled to the frame structure 240. As a non-limiting example, the first printed circuit board 250 and the second printed circuit board 252 may be fixed to the frame structure 240 through a coupling member such as a screw. As a non-limiting example, the battery 270 may be fixed to the frame structure 240 through an adhesive member (e.g., double-sided tape).

In an embodiment, the cover plate 260 may be disposed between the first printed circuit board 250 and the rear plate 211. In an embodiment, the cover plate 260 may be disposed on the first printed circuit board 250. For example, the cover plate 260 may be disposed on a surface of the first printed circuit board 250 facing the −z direction. In an embodiment, the cover plate 260 may at least partially overlap the first printed circuit board 250 with respect to the z-axis. In an embodiment, the cover plate 260 may cover at least a portion of the first printed circuit board 250. Accordingly, the cover plate 260 may protect the first printed circuit board 250 from physical impact or prevent the connector coupled to the first printed circuit board 250 from being separated.

In an embodiment, the cover plate 260 may be fixedly disposed on the first printed circuit board 250 through a coupling member (e.g., a screw), or may be coupled to the frame structure 240 together with the first printed circuit board 250 through the coupling member.

In an embodiment, the display 201 may be disposed between the frame structure 240 and the front plate 202. For example, the front plate 202 may be disposed on a side (e.g., +z direction) of the display 201, and the frame structure 240 may be disposed on another side (e.g., −z direction).

In an embodiment, the front plate 202 may be coupled to the display 201. For example, the front plate 202 and the display 201 may be attached to each other through an optical adhesive member (e.g., optically clear adhesive (OCA) or optically clear resin (OCR)) interposed therebetween.

In an embodiment, the front plate 202 may be coupled to the frame structure 240. As a non-limiting example, the front plate 202 may include an outer portion extending outside the display 201 when viewed in the z-axis direction, and may be attached to the frame structure 240 through an adhesive member (e.g., double-sided tape) disposed between the outer portion of the front plate 202 and the frame structure 240 (e.g., the sidewall 241).

In an embodiment, a processor (e.g., the processor 120 of FIG. 1), a memory (e.g., the memory 130 of FIG. 1), and/or an interface (e.g., the interface 177 of FIG. 1) may be mounted on the first printed circuit board 250 and/or the second printed circuit board 252. The processor may include, for example, one or more of a central processing unit, an application processor, a graphics processing unit, an image signal processor, a sensor hub processor, or a communication processor. The memory may include, for example, a volatile memory or a non-volatile memory. The interface may include, for example, a high definition multimedia interface (HDMI), a universal serial bus (USB) interface, an SD card interface, and/or an audio interface. The interface may electrically or physically connect the electronic device 200 to an external electronic device, and may include a USB connector, an SD card/MMC connector, or an audio connector. In an embodiment, the first printed circuit board 250 and the second printed circuit board 252 may be operably or electrically connected to each other through a connection member (e.g., a flexible printed circuit board).

In an embodiment, the battery 270 may supply power to at least one component of the electronic device 200. For example, the battery 270 may include a rechargeable secondary battery or a fuel cell. At least a portion of the battery 270 may be disposed substantially on the same plane as the first printed circuit board 250 and/or the second printed circuit board 252.

The electronic device 200 according to an embodiment may include an antenna module (e.g., the antenna module 197 of FIG. 1). In an embodiment, the antenna module may be disposed between the rear plate 211 and the battery 270. The antenna module may include, for example, a near field communication (NFC) antenna, a wireless charging antenna, and/or a magnetic secure transmission (MST) antenna. The antenna module may be used, for example, to near field communicate with an external device or to wirelessly transmit and receive power with an external device.

In an embodiment, the first camera module 205 (e.g., the front camera) may be disposed on at least a portion (e.g., the support portion 243) of the frame structure 240 so that the lens may receive external light through a partial area (e.g., a camera area 237) of the front plate 202 (e.g., the front surface 200A of FIG. 2A).

In an embodiment, the second camera module 212 (e.g., a rear camera) may be disposed between the frame structure 240 and the rear plate 211. In an embodiment, the second camera module 212 may be electrically connected to the first printed circuit board 250 through a connection member (e.g., a connector). In an embodiment, the second camera module 212 may be disposed so that the lens may receive external light through a camera area 284 of the rear plate 211 of the electronic device 200.

In an embodiment, the camera area 284 may be formed on a surface (e.g., the rear surface 200B of FIG. 2A) of the rear plate 211. In an embodiment, the camera area 284 may be formed to be at least partially transparent so that external light may be incident on the lens of the second camera module 212. In an embodiment, at least a portion of the camera area 284 may protrude from the surface of the rear plate 211 by a predetermined height. However, it is not limited thereto, and in another embodiment, the camera area 284 may form a substantially continuous plane on a surface of the rear plate 211.

In an embodiment, the housing 210 of the electronic device 200 may mean a configuration or structure forming at least a portion of the exterior of the electronic device 200. In this regard, at least a portion of the front plate 202, the frame structure 240, and/or the rear plate 211 forming the exterior of the electronic device 200 may be referred to as the housing 210 of the electronic device 200.

Although the bar-type electronic device 200 has been described with reference to FIGS. 2A and 2B, the shape of the electronic device 200 is not limited thereto. For example, the electronic device 200 may be implemented as a foldable device including a plurality of housings coupled to be capable of being folded or unfolded based on at least one axis. For example, the electronic device 200 may be implemented as a slidable device including a plurality of housings coupled to be slidable each other.

Figure 3:
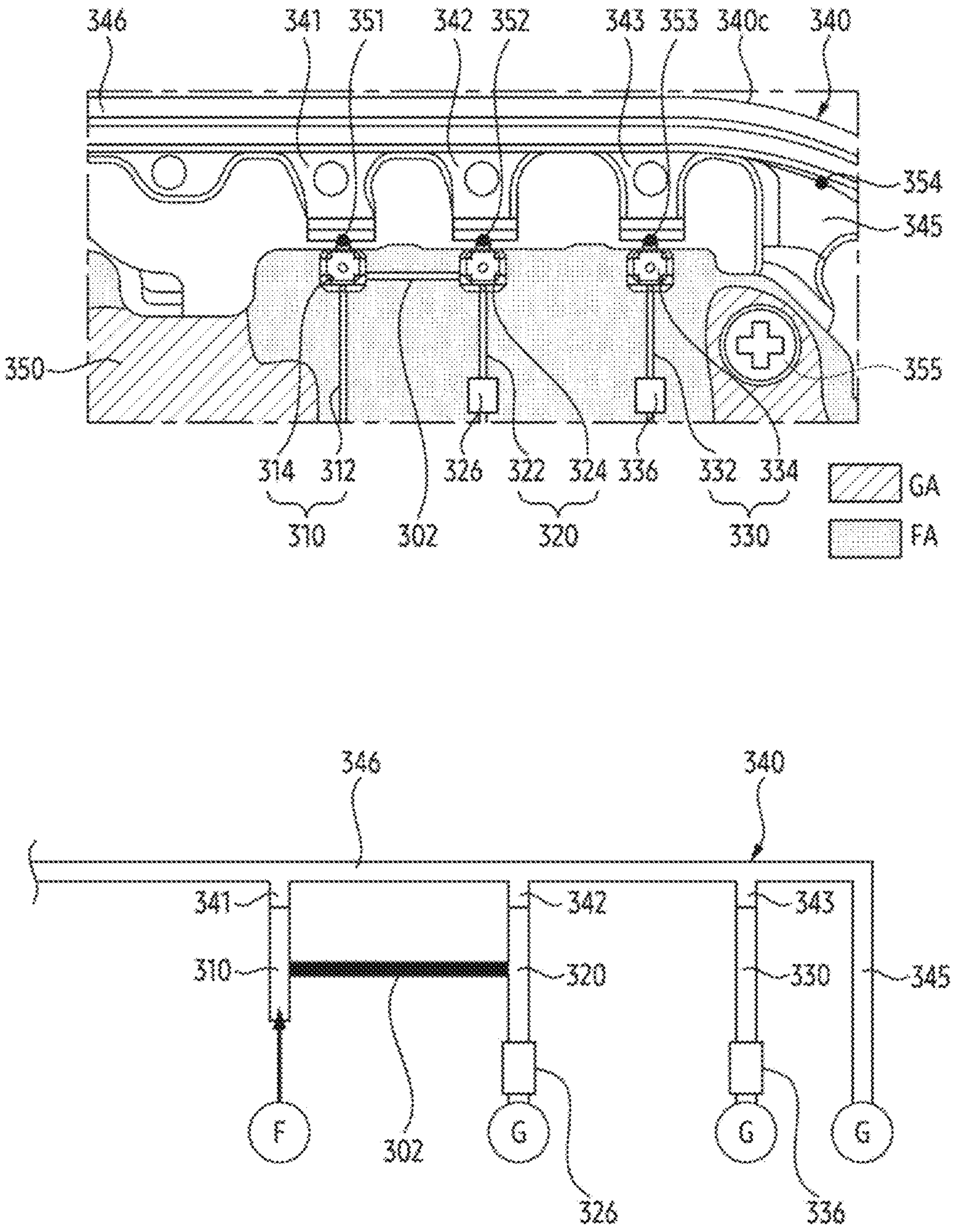
FIG. 3 illustrates an antenna structure of an electronic device according to an embodiment.

FIG. 3 illustrates an antenna structure of an electronic device according to an embodiment. Referring to FIG. 3, an electronic device (e.g., the electronic device 200 of FIG. 2B) according to an embodiment may include a conductive portion 340 and a printed circuit board 350 (e.g., the first printed circuit board 250 or the second printed circuit board 252 of FIG. 2B). In an embodiment, the printed circuit board 350 may include a ground area (GA) formed of a conductive material and a fill-cut area (FA). The fill-cut area may be a non-conductive area or a non-conductive portion of the printed circuit board 350. For example, the fill-cut area may be an area (or portion) of the printed circuit board 350 from which a conductive material has been removed. The fill-cut area may be an area where a fill (e.g., copper fill) of a conductive material of the printed circuit board 350 is not applied or removed.

In an embodiment, a wireless communication circuit (e.g., the wireless communication module 192 of FIG. 1) may be disposed on a substrate of the printed circuit board 350. In an embodiment, the conductive portion 340 may form a portion of the exterior (e.g., the side surface 100C of FIG. 2A) of the electronic device. For example, an external surface 340*c* of the conductive portion 340 may be exposed to the outside to form the external appearance of the electronic device. In an embodiment, the conductive portion 340 may include a first feed point 351, a first ground point 352, and a second ground point 353. In an embodiment, the conductive portion 340 may further include a third ground point 354.

In an embodiment, the first feed point 351 may be electrically connected to the wireless communication circuit. For example, the first feed point 351 may be electrically connected to the wireless communication circuit through a first feed path 310 of the printed circuit board 350. As a non-limiting example, the first feed path 310 may include a line 312 formed of a conductive material (e.g., copper) on the substrate of the printed circuit board 350 and a connector 314 connected to the line 312. The connector 314 may be connected to the conductive portion 340 by contacting the first feed point 351. As a non-limiting example, the connector 314 may include a C-clip or a pogo pin.

In an embodiment, the first ground point 352 may be electrically connected to a ground G of the electronic device. For example, the first ground point 352 may be electrically connected to the ground G through a first ground path 320 of the printed circuit board 350. As a non-limiting example, the first ground path 320 may include a line 322 formed of a conductive material (e.g., copper) and a connector 324 connected to the line 322. In an embodiment, when the printed circuit board 350 is formed as a multilayer board, the line 322 may be formed on an outer layer (e.g., the uppermost layer or the lowermost layer) and/or an inner layer of the multilayer board. The connector 324 may be connected to the conductive portion 340 by contacting the first ground point 352. As a non-limiting example, the connector 324 may include a C-clip or pogo pin.

In an embodiment, the second ground point 353 may be electrically connected to the ground G of the electronic device. For example, the second ground point 353 may be electrically connected to the ground G through a second ground path 330 of the printed circuit board 350. As a non-limiting example, the second ground path 330 may include a line 332 formed of a conductive material (e.g., copper) and a connector 334 connected to the line 332. In an embodiment, the line 332 may be formed on the outer layer and/or the inner layer of the printed circuit board 350. The connector 334 may be connected to the conductive portion 340 by contacting with the second ground point 353. As a non-limiting example, the connector 334 may include a C-clip or pogo pin.

In an embodiment, the ground G may include at least one of conductive members of the electronic device. As a non-limiting example, the conductive members providing the ground G may include a ground surface (e.g., the ground area (GA)) of the printed circuit board 350 formed of a conductive material (e.g., copper) and/or a conductive portion of a support member (e.g., the support portion 241 of FIG. 2B). For example, in case that the conductive members providing the ground G include both the ground surface of the printed circuit board 350 and the conductive portion of the support member, they may be electrically connected to each other. As a non-limiting example, the ground surface of the printed circuit board 350 and the conductive portion of the support member may be electrically connected to each other through a conductive connection member 355 such as a screw.

The electronic device according to an embodiment may include a connection portion 345 extending from the conductive portion 340. For example, the connection portion 345 may extend from an area of the conductive portion 340 including the third ground point 354. In an embodiment, the connection portion 345 may be formed of a conductive material (e.g., metal). As a non-limiting example, the connection portion 345 may be formed of substantially the same material as the conductive portion 340. As a non-limiting example, the connection portion 345 may be integrally formed with the conductive portion 340.

In an embodiment, the connection portion 345 may electrically connect the conductive portion 340 (or the third ground point 354) to the ground G of the electronic device. As a non-limiting example, the connection portion 345 extends from the conductive portion 340 to the support member providing the ground G, thereby electrically connecting the conductive portion 340 to the ground G. The third ground point 354 illustrated in FIG. 3 represents an arbitrary position between the conductive portion 340 and the connection portion 345, and a position of the third ground point 354 is not limited by the illustrated example. For example, the connection portion 345 may be referred to as a 'third ground path' connecting the third ground point 354 of the conductive portion 340 to the ground G.

In an embodiment, the first feed point 351, the first ground point 352, the second ground point 353, and the third ground point 354 may be located in the conductive portion 340 (for example, in that order). For example, the first ground point 352 may be located between the first feed point 351 and the second ground point 353, and the second ground point 353 may be located between the first ground point 352 and the third ground point 354.

In an embodiment, the conductive portion 340 may include a side surface portion 346, a first protrusion portion 341, a second protrusion portion 342, and/or a third protrusion portion 343. The side surface portion 346 may form the external surface 340*c* of the conductive portion 340. The side surface portion 346 may be a portion of a housing (e.g., the sidewall 241 of FIG. 2B) forming a side surface (e.g., the side surface 100C of FIG. 2A) of the electronic device. In an embodiment, the first protrusion portion 341 may extend from the side surface portion 346. For example, the first protrusion portion 341 may extend from the side surface portion 346 in a direction (e.g., an inward direction of the electronic device) opposite to a direction in which the external surface 340*c* faces. The first protrusion portion 341 may be referred to as a first flange protruding from the side surface portion 346. In an embodiment, the second protrusion portion 342 may extend from the side surface portion 346. For example, the second protrusion portion 342 may extend from the side surface portion 346 in a direction (e.g., the inward direction of the electronic device) opposite to the direction in which the external surface 340*c* faces. In an embodiment, the second protrusion portion 342 may be referred to as a second flange protruding from the side surface portion 346. In an embodiment, the third protrusion portion 343 may extend from the side surface portion 346. For example, the third protrusion portion 343 may extend from the side surface portion 346 in a direction (e.g., the inward direction of the electronic device) opposite to the direction in which the external surface 340*c* faces. In an embodiment, the third protrusion portion 343 may be referred to as a third flange protruding from the side surface portion 346.

In an embodiment, the second protrusion portion 342 may be located between the first protrusion portion 341 and the third protrusion portion 343. The third protrusion portion 343 may be located between the second protrusion portion 342 and the connection portion 345. In an embodiment, the first feed point 351 may be located at an end portion of the first protrusion portion 341, the first ground point 352 may be located at an end portion of the second protrusion portion 342, and the second ground point 353 may be located at an end portion of the third protrusion portion 343.

Alternatively or optionally, the conductive portion 340 may not include at least one of the first protrusion portion 341, the second protrusion portion 342, and/or the third protrusion portion 343. In this case, at least one of the first feed point 351, the first ground point 352, and/or the second ground point 353 may be located on the side surface portion 346 of the conductive portion 340.

In an embodiment, the electronic device (or the printed circuit board 350) may include a first conductive pattern 302 formed of a conductive material (e.g., copper). In an embodiment, the first conductive pattern 302 may be formed on the printed circuit board 350. As a non-limiting example, at least a portion of the first conductive pattern 302 may be formed on a surface of the substrate of the printed circuit board 350. For another example, at least a portion of the first conductive pattern 302 may be formed inside the printed circuit board 350. In an embodiment, the first conductive pattern 302 may be formed on (and/or within) a fill-cut area (FA) of the printed circuit board 350.

In an embodiment, the first conductive pattern 302 may be connected between the first feed path 310 and the first ground path 320. For example, the first conductive pattern 302 may extend from a point of the first feed path 310 to a point of the first ground path 320. As a non-limiting example, the first conductive pattern 302 may extend from the connector 314 (or a conductive pad on the substrate of the printed circuit board 350 on which the connector 314 is disposed) of the first feed path 310 to the connector 324 (or a conductive pad on the substrate of the printed circuit board 350 on which the connector 324 is disposed) of the first ground path 320. For another example, unlike the illustration, the first conductive pattern 302 may extend from the connector 314 of the first feed path 310 to the line 322 of the first ground path 320. For another example, unlike the illustration, the first conductive pattern 302 may extend from the line 312 of the first feed path 310 to the connector 324 of the first ground path 320.

According to an embodiment, the electronic device may further include a first matching circuit 326 and/or a second matching circuit 336. In an embodiment, the first matching circuit 326 may be located or included in the first ground path 320. For example, the first matching circuit 326 may be connected between the first conductive pattern 302 and the ground G. In an embodiment, the second matching circuit 336 may be located or included in the second ground path 330. In an embodiment, the first matching circuit 326 and/or the second matching circuit 336 may be configured to adjust a resonance characteristic of an antenna including the conductive portion 340 and the first conductive pattern 302.

In an embodiment, the wireless communication circuit may supply a signal F, through the first feed path 310, to the conductive portion 340 and the first conductive pattern 302, and the signal F may be radiated through the conductive portion 340 and the first conductive pattern 302.

Figure 4:
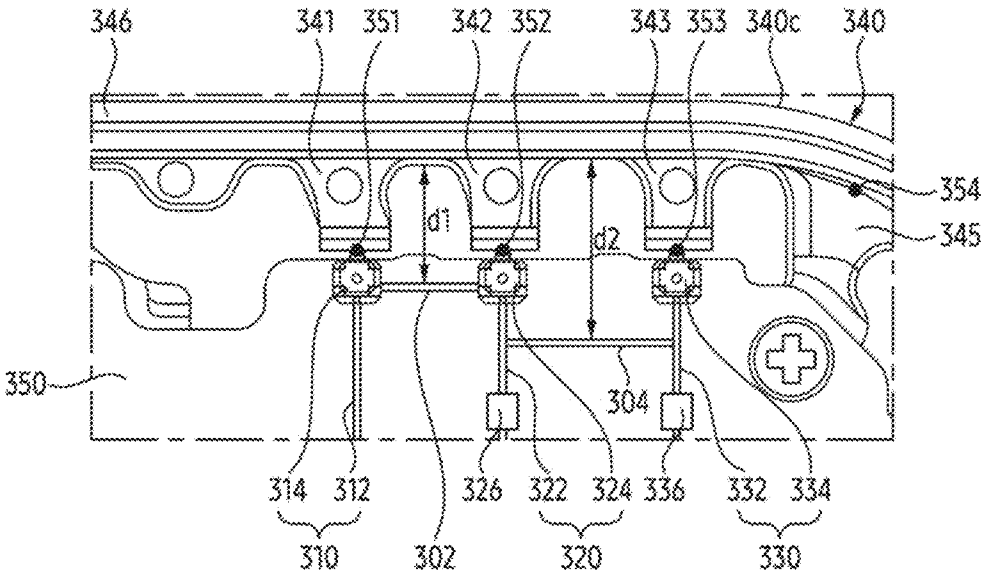
FIG. 4 illustrates an antenna structure of an example electronic device according to an embodiment.
Figure 4:
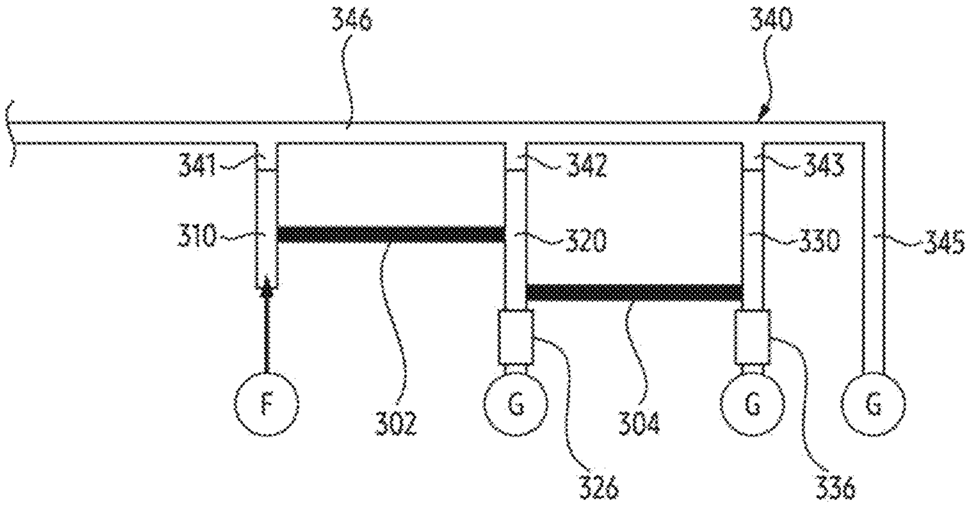
Figure 5:
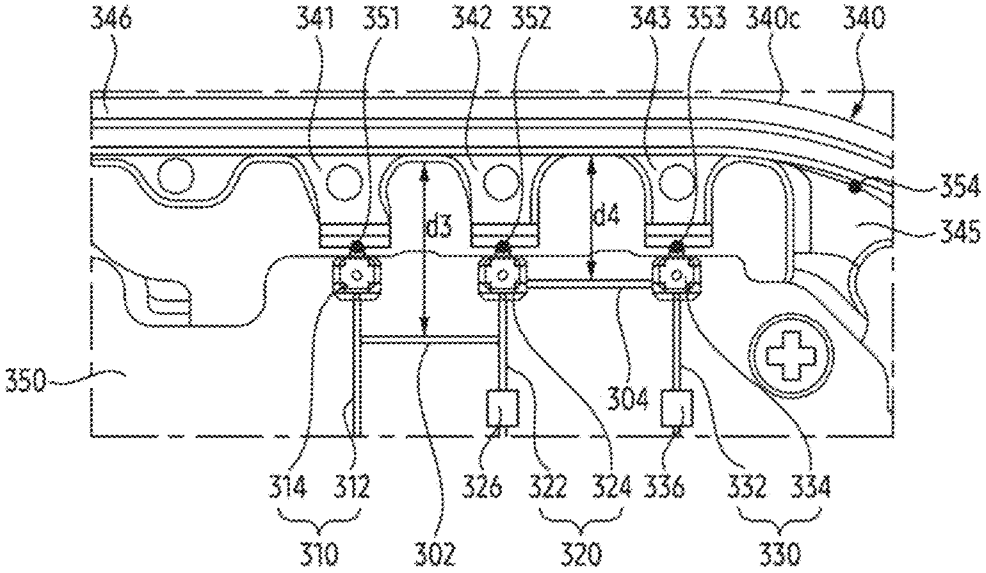
FIG. 5 illustrates an antenna structure of an example electronic device according to an embodiment.
Figure 5:
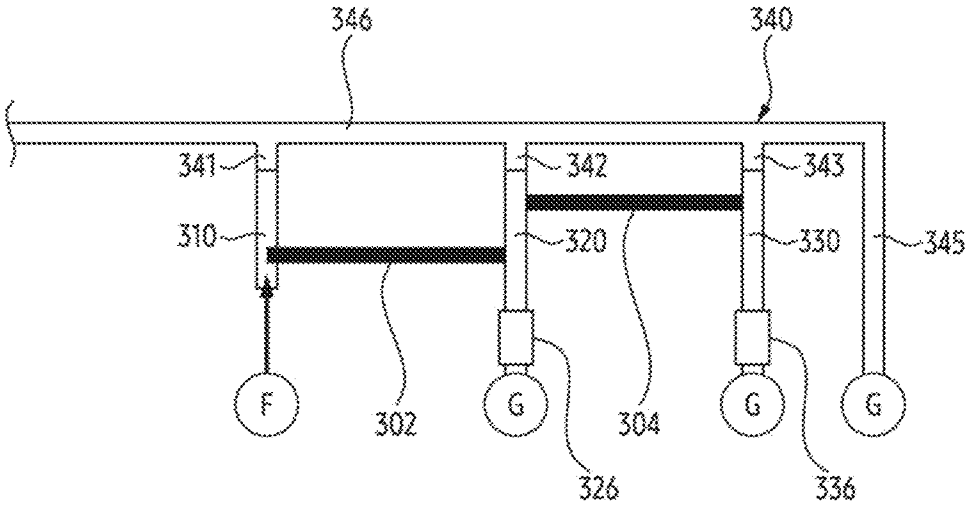
Figure 6:
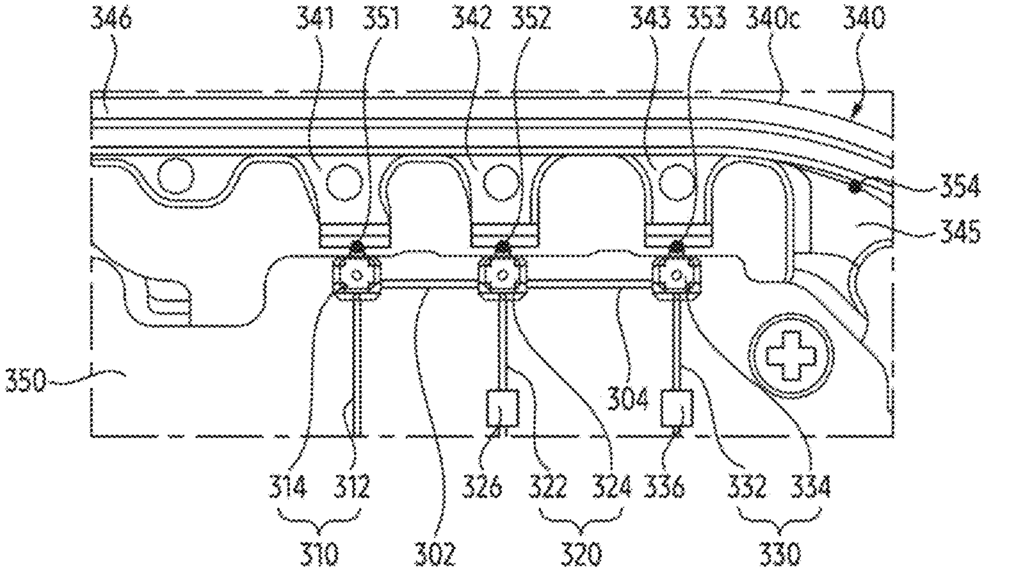
FIG. 6 illustrates an antenna structure of an example electronic device according to an embodiment.
Figure 6:
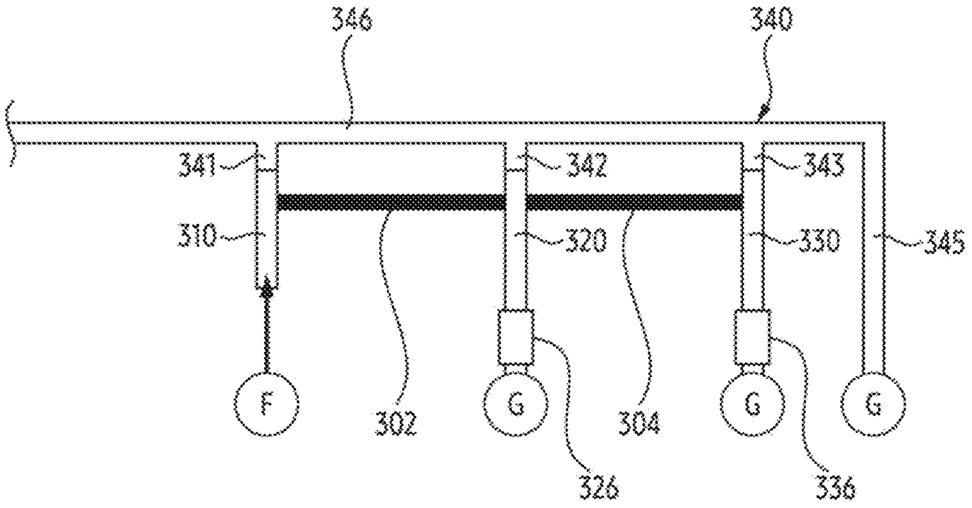

FIGS. 4, 5, and 6 illustrate an antenna structure of an example electronic device according to an embodiment.

Referring to FIGS. 4, 5, and 6, in an embodiment, a first conductive pattern 302 may extend from a first feed path 310 to a first ground path 320. For example, as shown in FIG. 4, the first conductive pattern 302 may extend from a connector 314 of the first feed path 310 to a connector 324 of the first ground path 320. For example, as shown in FIG. 5, the first conductive pattern 302 may extend from a line 312 of the first feed path 310 to a line 322 of the first ground path 320.

According to an embodiment, the electronic device (or the printed circuit board 350) may include a second conductive pattern 304 formed of a conductive material (e.g., copper). In an embodiment, the second conductive pattern 304 may be formed on the printed circuit board 350. As a non-limiting example, at least a portion of the second conductive pattern 304 may be formed on a surface of a substrate of the printed circuit board 350. For another example, at least a portion of the second conductive pattern 304 may be formed inside the printed circuit board 350. In an embodiment, the second conductive pattern 304 may be formed on (and/or within) a fill-cut area of the printed circuit board 350.

In an embodiment, the second conductive pattern 304 may be connected between the first ground path 320 and a second ground path 330. For example, the second conductive pattern 304 may extend from a point of the first ground path 320 to a point of the second ground path 330. For example, as shown in FIG. 4, the second conductive pattern 304 may extend from the line 322 of the first ground path 320 to a line 332 of the second ground path 330. For another example, unlike the illustration, the second conductive pattern 304 may extend from the line 322 of the first ground path 320 to a connector 334 of the second ground path 330. For example, as shown in FIG. 5, the second conductive pattern 304 may extend from the connector 324 (or a conductive pad on the substrate of the printed circuit board 350 on which the connector 324 is disposed) of the first ground path 320 to the connector 334 (or a conductive pad on the substrate of the printed circuit board 350 on which the connector 334 is disposed) of the second ground path 330. For another example, unlike the illustration, the second conductive pattern 304 may extend from the connector 324 of the first ground path 320 to the line 332 of the second ground path 330.

In an embodiment, a first matching circuit 326 located in the first ground path 320 may be located between the second conductive pattern 304 and a ground G. In an embodiment, a second matching circuit 336 located in the second ground path 330 may be located between the second conductive pattern 304 and a ground G. In an embodiment, the first matching circuit 326 and/or the second matching circuit 336 may be configured to adjust a radiation characteristic and/or a resonance characteristic of an antenna including the conductive portion 340, the first conductive pattern 302, and the second conductive pattern 304.

In an embodiment, the first conductive pattern 302 and the second conductive pattern 304 may be spaced apart from the conductive portion 340. For example, distances where the first conductive pattern 302 and the second conductive pattern 304 are spaced apart from the conductive portion 340 may be different from each other or may be substantially the same.

For example, referring to FIG. 4, the first conductive pattern 302 may be spaced apart from the side surface portion 346 of the conductive portion 340 by a first distance d1, and the second conductive pattern 304 may be spaced apart from the side surface portion 346 of the conductive portion 340 by a second distance d2. In an embodiment, the second distance d2 may be greater than the first distance d1. As a non-limiting example, the first distance d1 may be about 0.7 mm or more. As a non-limiting example, the first distance d1 may be about 0.7 mm to about 2.1 mm. As a non-limiting example, the second distance d2 may be about 1.0 mm or more. As a non-limiting example, the second distance d2 may be about 1.0 mm to about 3.0 mm. In an embodiment, a point where the first conductive pattern 302 is connected to the first ground path 320 may be located closer to the first ground point 352 than a point where the second conductive pattern 304 is connected to the first ground path 320.

For example, referring to FIG. 5, the first conductive pattern 302 may be spaced apart from the side surface portion 346 of the conductive portion 340 by a third distance d3, and the second conductive pattern 304 may be spaced apart from the side surface portion 346 of the conductive portion 340 by a fourth distance d4. In an embodiment, the third distance d3 may be greater than the fourth distance d4. As a non-limiting example, the third distance d3 may be about 1.0 mm or more. As a non-limiting example, the third distance d3 may be about 1.0 mm to about 3.0 mm. As a non-limiting example, the fourth distance d4 may be about 0.7 mm or more. As a non-limiting example, the fourth distance d4 may be about 0.7 mm to about 2.1 mm. In an embodiment, a point where the first conductive pattern 302 is connected to the first ground path 320 may be located farther from the first ground point 352 than a point where the second conductive pattern 304 is connected to the first ground path 320.

For example, referring to FIG. 6, the first conductive pattern 302 and the second conductive pattern 304 may be spaced apart from the conductive portion 340 by substantially the same distance from each other. As a non-limiting example, the first conductive pattern 302 and the second conductive pattern 304 may extend substantially parallel to each other. As a non-limiting example, the first conductive pattern 302 and the second conductive pattern 304 may be substantially parallel to the side surface portion 346 (or the external surface 340*c*) of the conductive portion 340. In an embodiment, the first conductive pattern 302 and the second conductive pattern 304 may be connected to the same point of the first ground path 320.

In an embodiment, the wireless communication circuit may supply a signal F, through the first feed path 310, to the conductive portion 340, the first conductive pattern 302, and the second conductive pattern 304. The signal F may be radiated through the conductive portion 340, the first conductive pattern 302, and the second conductive pattern 304.

Figure 7:
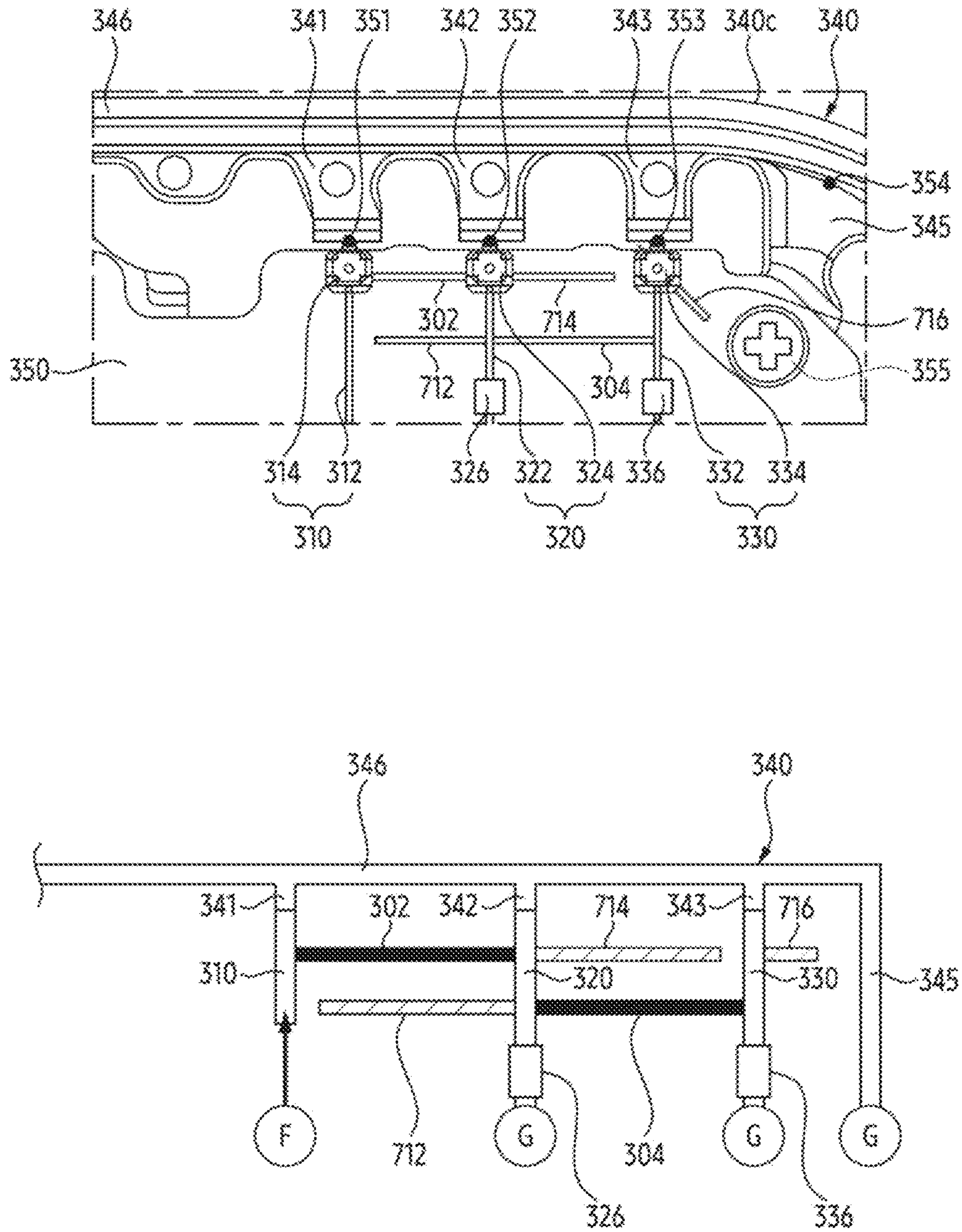
FIG. 7 illustrates an antenna structure of an example electronic device according to an embodiment.

FIG. 7 is a diagram illustrating an antenna structure of an example electronic device according to an embodiment. Referring to FIG. 7, the electronic device (or the printed circuit board 350) according to an embodiment may include at least one of a first stub pattern 712, a second stub pattern 714, and/or a third stub pattern 716.

In an embodiment, the first stub pattern 712 may extend from a first ground path 320 toward a first feed path 310. An end portion of the first stub pattern 712 may be spaced apart from the first feed path 310. The first stub pattern 712 may be formed on (and/or within) the fill-cut area of the printed circuit board 350. In an embodiment, the first conductive pattern 302 may be located between the first stub pattern 712 and the conductive portion 340, but is not limited thereto. For example, unlike the illustration, the first stub pattern 712 may be located between the first conductive pattern 302 and the conductive portion 340. In an embodiment, a first matching circuit 326 located on the first ground path 320 may be located between the first stub pattern 712 and a ground G.

In an embodiment, the second stub pattern 714 may extend from the first ground path 320 toward the second ground path 330. An end portion of the second stub pattern 714 may be spaced apart from the second ground path 330. The second stub pattern 714 may be formed on (and/or within) the fill-cut area of the printed circuit board 350. In an embodiment, the second stub pattern 714 may be located between the second conductive pattern 304 and the conductive portion 340, but is not limited thereto. For example, unlike the illustration, the second conductive pattern 304 may be located between the second stub pattern 714 and the conductive portion 340. In this case, the second matching circuit 336 located on the second ground path 330 may be located between the second stub pattern 714 and a ground G.

In an embodiment, the third stub pattern 716 may extend from the second ground path 330 toward the third ground path (e.g., the connection portion 345 or the conductive connection member 355). An end portion of the third stub pattern 716 may be spaced apart from the third ground path. Unlike the illustration, the end portion of the third stub pattern 716 may be connected to the third ground path (e.g., a third conductive pattern 906 of FIG. 9). In an embodiment, the third stub pattern 716 may be formed on (and/or within) the fill-cut area of the printed circuit board 350.

In some embodiments, optionally, the electronic device (or the printed circuit board 350) according to an embodiment may include a stub pattern extending from the second ground path 330 toward the first ground path 320.

Figure 8:
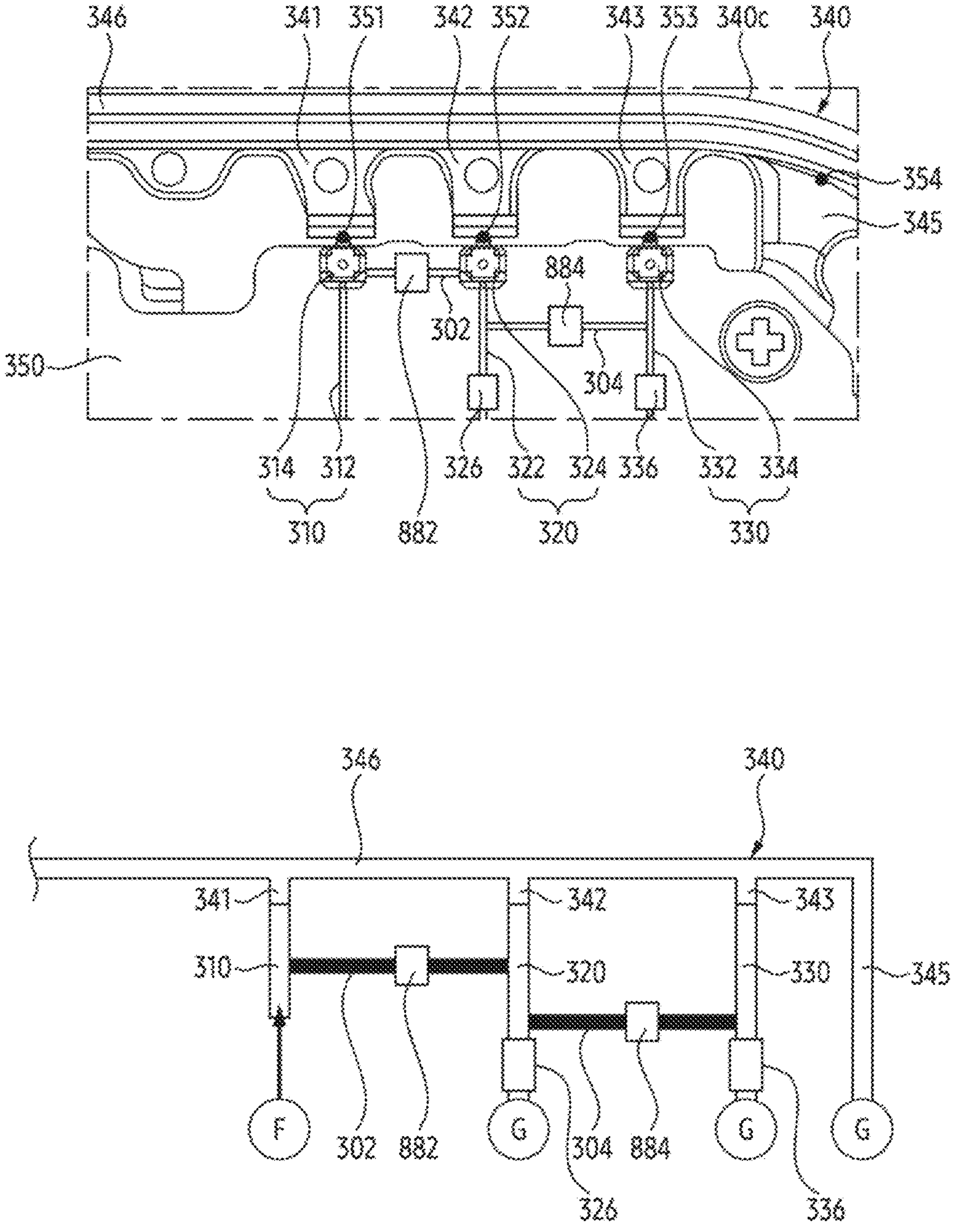
FIG. 8 illustrates an antenna structure of an example electronic device according to an embodiment.

FIG. 8 illustrates an antenna structure of an example electronic device according to an embodiment. Referring to FIG. 8, according to an embodiment, the electronic device may further include a first tuning circuit 882 and/or a second tuning circuit 884. In an embodiment, the first tuning circuit 882 may include a matching circuit and/or a switch circuit. In an embodiment, the second tuning circuit 884 may include a matching circuit and/or a switch circuit. The matching circuit may be configured to adjust an impedance characteristic. The switch circuit may be configured to open and close a circuit to control the flow of current. For example, the first tuning circuit 882 and/or the second tuning circuit 884 may adjust a resonance frequency and impedance matching, by changing an electrical length through an electrical connection and various lumped elements.

In an embodiment, the first tuning circuit 882 and the second tuning circuit 884 may be disposed on a substrate of the printed circuit board 350. The first tuning circuit 882 may be connected to a first conductive pattern 302, and the second tuning circuit 884 may be connected to a second conductive pattern 304.

Figure 9:
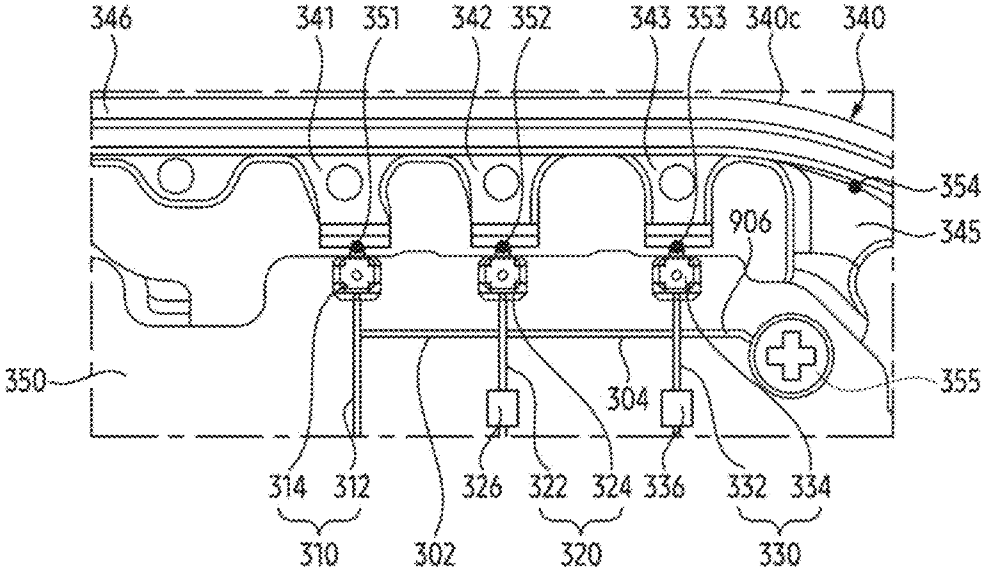
FIG. 9 illustrates an antenna structure of an example electronic device according to an embodiment.
Figure 9:
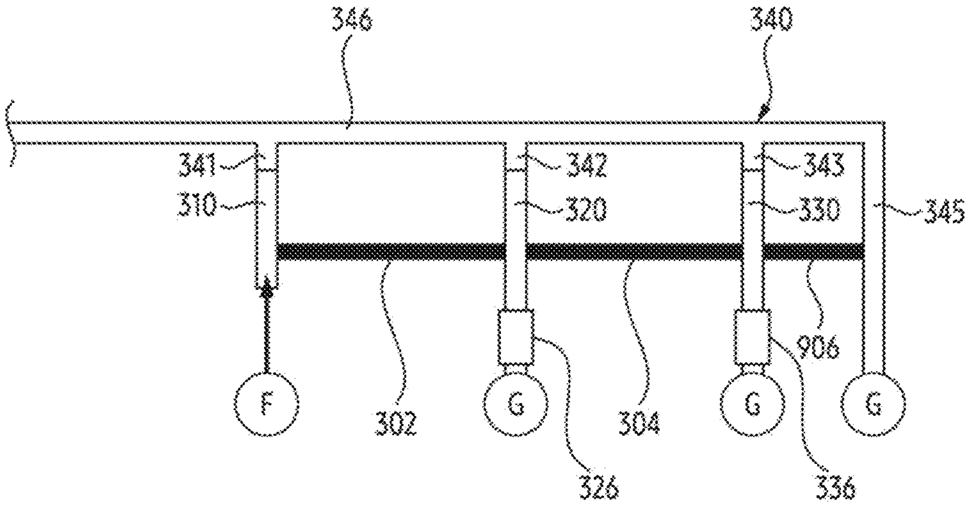

FIG. 9 illustrates an antenna structure of an example electronic device according to an embodiment. Referring to FIG. 9, the electronic device (or the printed circuit board 350) according to an embodiment may further include a third conductive pattern 906. In an embodiment, the third conductive pattern 906 may be formed of a conductive material (e.g., copper). In an embodiment, the third conductive pattern 906 may be formed on the printed circuit board 350. As a non-limiting example, at least a portion of the third conductive pattern 906 may be formed on a surface of a substrate of the printed circuit board 350. For another example, at least a portion of the third conductive pattern 906 may be formed inside the printed circuit board 350. In an embodiment, the third conductive pattern 906 may be formed on (and/or within) the fill-cut area of the printed circuit board 350.

In an embodiment, the third conductive pattern 906 may be connected between a second ground path 330 and a third ground path. For example, the third conductive pattern 906 may extend from one point of the second ground path 330 to the third ground path. As a non-limiting example, the third conductive pattern 906 may extend to a conductive connection member 355 to be connected to the conductive connection member 355. Accordingly, the second ground path 330 may be connected to the third ground path.

In an embodiment, a second conductive pattern 304 and the third conductive pattern 906 may be connected to the same point of the second ground path 330, but are not limited thereto.

In an embodiment, the third conductive pattern 906 may extend from a line 332 of the second ground path 330, but is not limited thereto. For example, the third conductive pattern 906 may extend from a connector 334 of the second ground path 330.

In some embodiments, additionally or optionally, the electronic device according to an embodiment may include a third tuning circuit (e.g., the first tuning circuit 882) connected to the third conductive pattern 906. The third tuning circuit may be disposed on a substrate of the printed circuit board 350. The third tuning circuit may include the matching circuit and/or the switch circuit.

Figure 10:
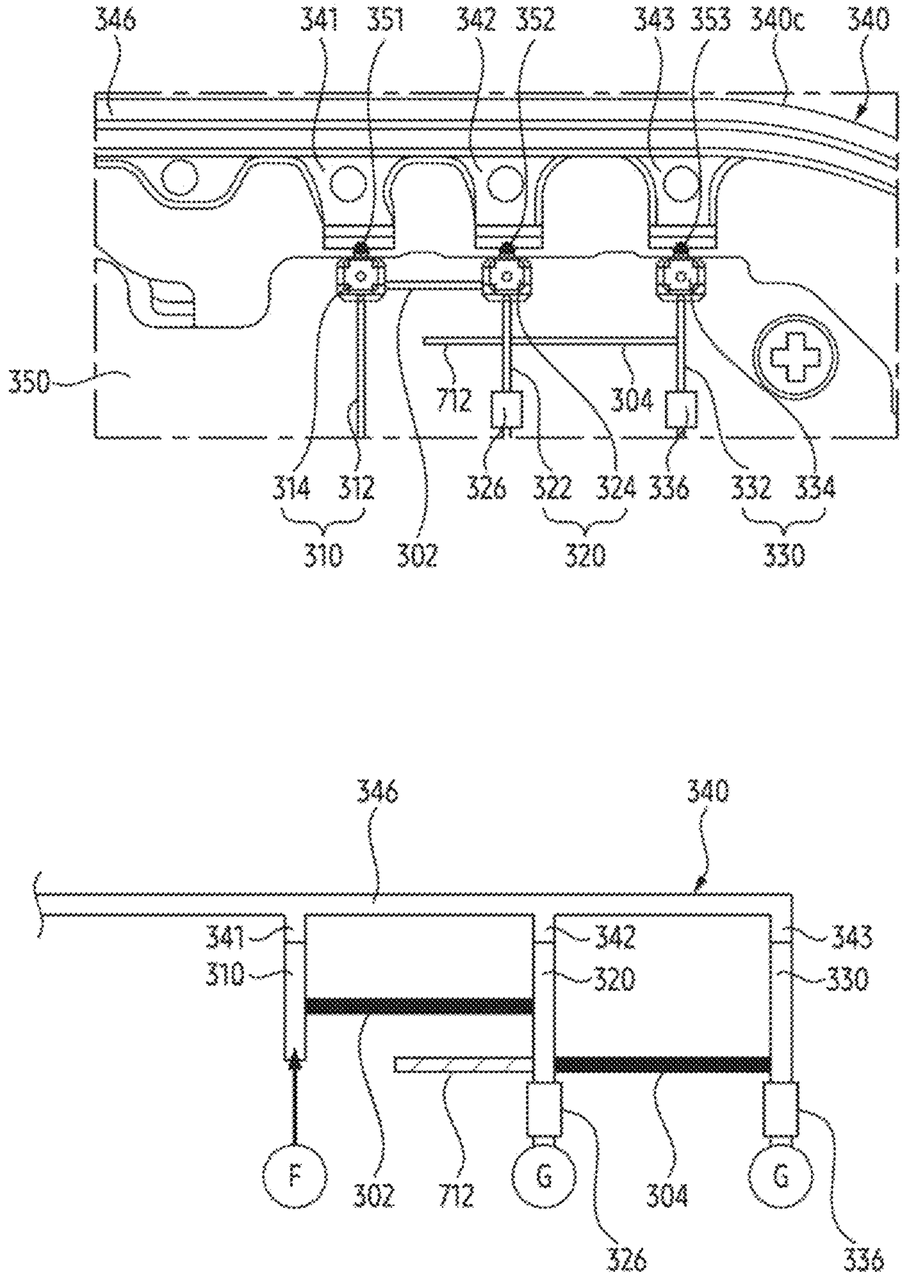
FIG. 10 illustrates an antenna structure of an example electronic device according to an embodiment.

FIG. 10 illustrates an antenna structure of an example electronic device according to an embodiment. Referring to FIG. 10, the electronic device according to an embodiment may not include the third ground point 354 and the connection portion 345 of FIG. 9.

Figure 11:
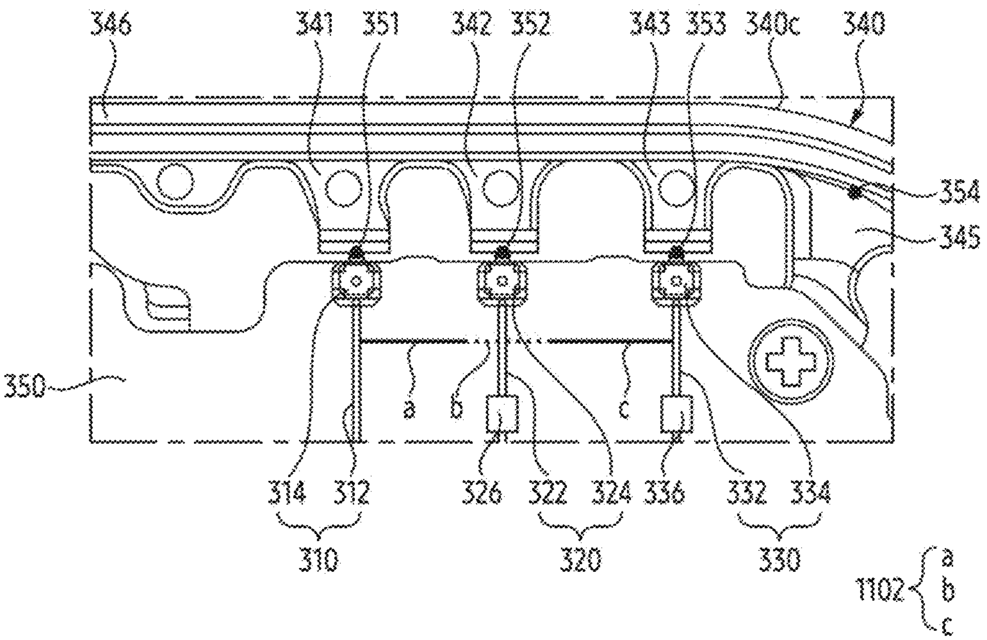
FIG. 11 illustrates an antenna structure of an example electronic device according to an embodiment.

FIG. 11 illustrates an antenna structure of an example electronic device according to an embodiment. Referring to FIG. 11, the electronic device (or the printed circuit board 350) according to an embodiment may include a fourth conductive pattern 1102 formed of a conductive material (e.g., copper). In an embodiment, the fourth conductive pattern 1102 may be formed on (and/or within) a fill-cut area of the printed circuit board 350.

In an embodiment, the fourth conductive pattern 1102 may be connected between a first feed path 310 and a second ground path 330. For example, the fourth conductive pattern 1102 may extend from a point of the first feed path 310 to a point of the second ground path 330. For example, the fourth conductive pattern 1102 may extend from a line 312 of the first feed path 310 to a line 332 of the second ground path 330, but is not limited thereto. For example, the fourth conductive pattern 1102 may extend from a connector 314 (or a conductive pad on a substrate of the printed circuit board 350 on which the connector 314 is disposed) of the first feed path 310 to the line 332 of the second ground path 330 or a connector 334 (or a conductive pad on the substrate of the printed circuit board 350 on which the connector 334 is disposed).

In an embodiment, the fourth conductive pattern 1102 may be at least partially formed inside the printed circuit board 350. For example, the fourth conductive pattern 1102 may include segments a and c formed on the substrate of the printed circuit board 350 and a segment b formed inside the printed circuit board 350. The segment b may be formed on a layer at least partially different from the first ground path 320 so as not to be connected to the first ground path 320. In some embodiments, the fourth conductive pattern 1102 may include conductive vias for routing the segment b and segments a and c located on a layer different from the segment b. Unlike the illustration, the entire fourth conductive pattern 1102 may be formed inside the printed circuit board 350.

In an embodiment, the fourth conductive pattern 1102 may replace the first conductive pattern 302 described above or may be additionally provided to the first conductive pattern 302.

Figure 12:
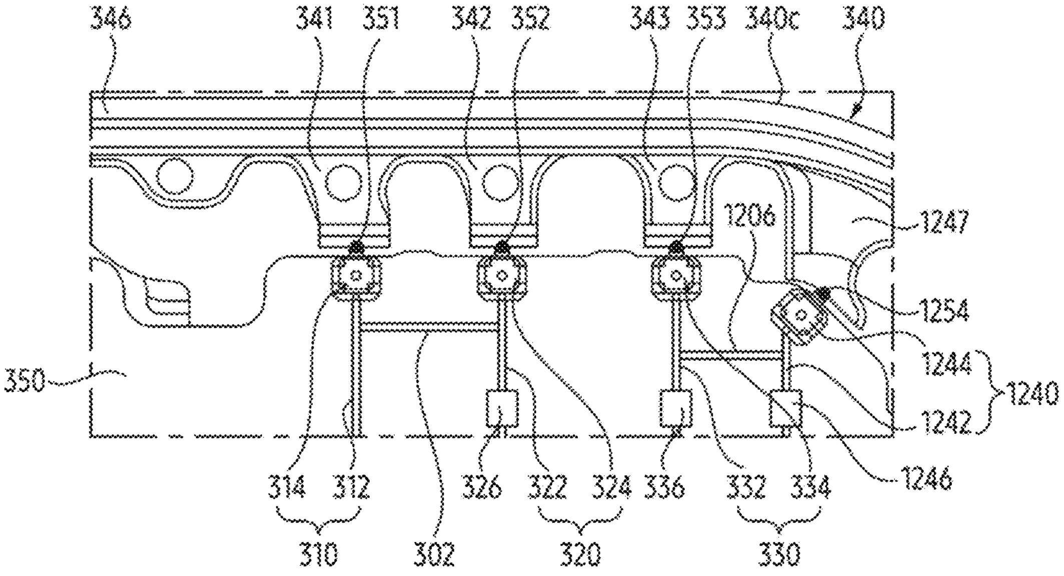
FIG. 12 illustrates an antenna structure of an example electronic device according to an embodiment.

FIG. 12 illustrates an antenna structure of an example electronic device according to an embodiment. Referring to FIG. 12, a conductive portion 340 according to an embodiment may include a fourth protrusion portion 1247. In an embodiment, the fourth protrusion portion 1247 may extend from a side surface portion 346. For example, the fourth protrusion portion 1247 may extend from the side surface portion 346 in a direction (e.g., an inward direction of the electronic device) opposite to a direction in which an external surface 340*c* faces. The fourth protrusion portion 1247 may be referred to as a fourth flange protruding from the side surface portion 346.

In an embodiment, a third protrusion 343 may be located between the fourth protrusion portion 1247 and a second protrusion portion 342. In an embodiment, the conductive portion 340 may include a fourth ground point 1254 located at an end portion of the fourth protrusion portion 1247. Alternatively or optionally, the conductive portion 340 may not include the fourth protrusion portion 1247. In this case, the fourth ground point 1254 may be located on the side surface portion 346 of the conductive portion 340.

In an embodiment, the fourth protrusion portion 1247 and the fourth ground point 1254 may replace the connection portion 345 and the third ground point 354 described above, or may be additionally provided to the connection portion 345 and the third ground point 354. In case that the fourth protrusion portion 1247 is additionally provided to the connection portion 345, the fourth protrusion portion 1247 may be located between the third protrusion portion 343 and the connection portion 345, or the connection portion 345 may be located between the third protrusion portion 343 and the fourth protrusion portion 1247.

In an embodiment, the fourth ground point 1254 may be electrically connected to a ground (e.g., the ground G of FIG. 10) of the electronic device. For example, the fourth ground point 1254 may be electrically connected to the ground through the fourth ground path 1240 of the printed circuit board 350. As a non-limited example, the fourth ground path 1240 may include a line 1242 formed of a conductive material (e.g., copper) and a connector 1244 connected to the line 1242. In an embodiment, the line 1242 of the fourth ground path 1240 may be formed on the outer layer and/or the inner layer of the printed circuit board 350. In an embodiment, the connector 1244 may be connected to the conductive portion 340 by contacting the fourth ground point 1254 of the fourth protrusion portion 1247. As a non-limited example, the connector 1244 may include a C-clip or pogo pin.

In an embodiment, the electronic device (or the printed circuit board 350) may include a fifth conductive pattern 1206 formed of a conductive material (e.g., copper). In an embodiment, the fifth conductive pattern 1206 may be formed at least partially on a surface of a substrate of the printed circuit board 350. As a non-limiting example, the entire fifth conductive pattern 1206 may be formed on the surface of the substrate of the printed circuit board 350. For another example, a portion of the fifth conductive pattern 1206 may be formed inside the printed circuit board 350. In an embodiment, the fifth conductive pattern 1206 may be formed on (and/or within) the fill-cut area of the printed circuit board 350.

In an embodiment, the fifth conductive pattern 1206 may be connected between the second ground path 330 and the fourth ground path 1240. For example, the fifth conductive pattern 1206 may extend from a point of the second ground path 330 to a point of the fourth ground path 1240. In an embodiment, the fifth conductive pattern 1206 may extend from the line 332 of the second ground path 330 to the line 1242 of the fourth ground path 1240, but is not limited thereto. For example, the fifth conductive pattern 1206 may extend from a connector 334 (or a conductive pad on the substrate of the printed circuit board 350 on which the connector 334 is disposed) of the second ground path 330 to the line 1242 of the fourth ground path 1240 or the connector 1244 (or a conductive pad on the substrate of the printed circuit board 350 on which the connector 1244 is disposed). For example, the fifth conductive pattern 1206 may extend from the line 332 of the second ground path 330 to the connector 1244 of the fourth ground path 1240.

According to an embodiment, the electronic device may further include a third matching circuit 1246. In an embodiment, the third matching circuit 1246 may be located in the fourth ground path 1240. For example, the third matching circuit 1246 may be connected between the fifth conductive pattern 1206 and the ground. The third matching circuit 1246 may be configured to adjust a resonance characteristic of an antenna including the conductive portion 340, the first conductive pattern 302, and the fifth conductive pattern 1206.

In some embodiments, additionally or optionally, according to an embodiment, the electronic device may further include a fourth tuning circuit (e.g., the first tuning circuit 882) connected to the fifth conductive pattern 1206. The fourth tuning circuit may be disposed on the substrate of the printed circuit board 350. The fourth tuning circuit may include the matching circuit and/or the switch circuit.

In an embodiment, the wireless communication circuit may supply a signal F to the conductive portion 340, the first conductive pattern 302, and the fifth conductive pattern 1206 through a first feed path 310. The signal F may be radiated through the conductive portion 340, the first conductive pattern 302, and the fifth conductive pattern 1206.

Although not illustrated, the electronic device according to an embodiment may further include at least one of the second conductive pattern 304, the third conductive pattern 906, the fourth conductive pattern 1102, the first stub pattern 712, the second stub pattern 714, the third stub pattern 716, the first tuning circuit 882, the second tuning circuit 884, and/or the third tuning circuit described above.

Figure 13:
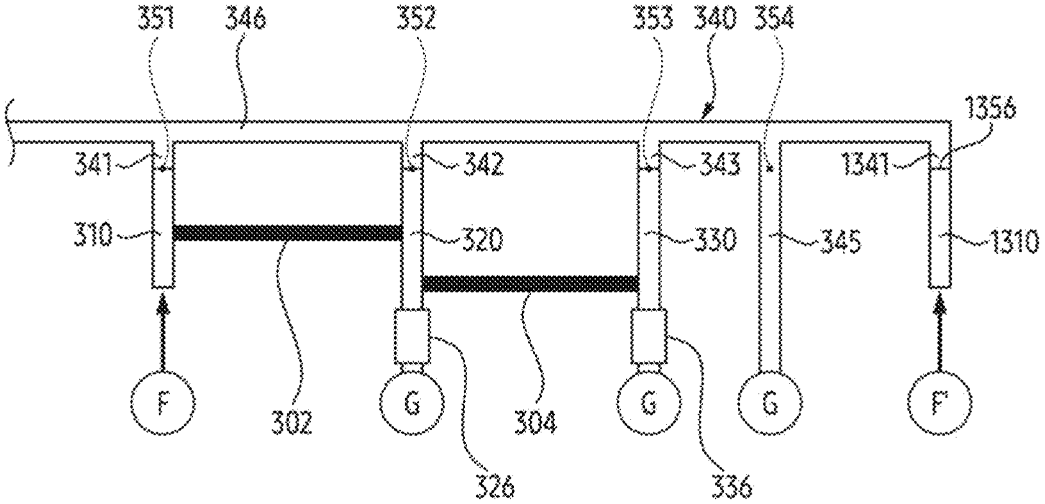
FIG. 13 illustrates an antenna structure of an example electronic device according to an embodiment.

FIG. 13 illustrates an antenna structure of an example electronic device according to an embodiment. Referring to FIG. 13, according to an embodiment, a conductive portion 340 may include a second feed point 1356.

In an embodiment, the second feed point 1356 may be electrically connected to the wireless communication circuit. For example, the second feed point 1356 may be electrically connected to the wireless communication circuit through a second feed path 1310 of the printed circuit board 350. As a non-limiting example, similar to the first feed path 310 described above, the second feed path 1310 may include a line (e.g., the line 312 of FIG. 3) formed of a conductive material on a substrate of the printed circuit board 350, and/or a connector (e.g., the connector 314 of FIG. 3) connected to the line. The connector may be connected to the conductive portion 340 by contacting the second feed point 1356.

In an embodiment, the second feed point 1356 may be adjacent to the third ground point 354 from among the first feed point 351 and the ground points 352, 353, and 354. For example, the third ground point 354 may be located between the second feed point 1356 and the second ground point 353. In an embodiment, the second feed point 1356 may be formed at an end portion of a protrusion portion (or flange) 1341 extending from the side surface portion 346 like as the first protrusion portion 341 described above.

Unlike the illustration, the connection portion 345 connecting the third ground point 354 to the ground G may be replaced with the fourth ground path 1240 of FIG. 12. In this case, additionally or optionally, the electronic device may include a conductive pattern (e.g., the first conductive pattern 302) provided by the printed circuit board (e.g., the printed circuit board 350 of FIG. 12) and extended from the second feed path 1310 to the fourth ground path 1240.

In an embodiment, the wireless communication circuit may supply a signal F' to the conductive portion 340 through the second feed path 1310, and the signal F' may be radiated through the conductive portion 340.

Figure 14:
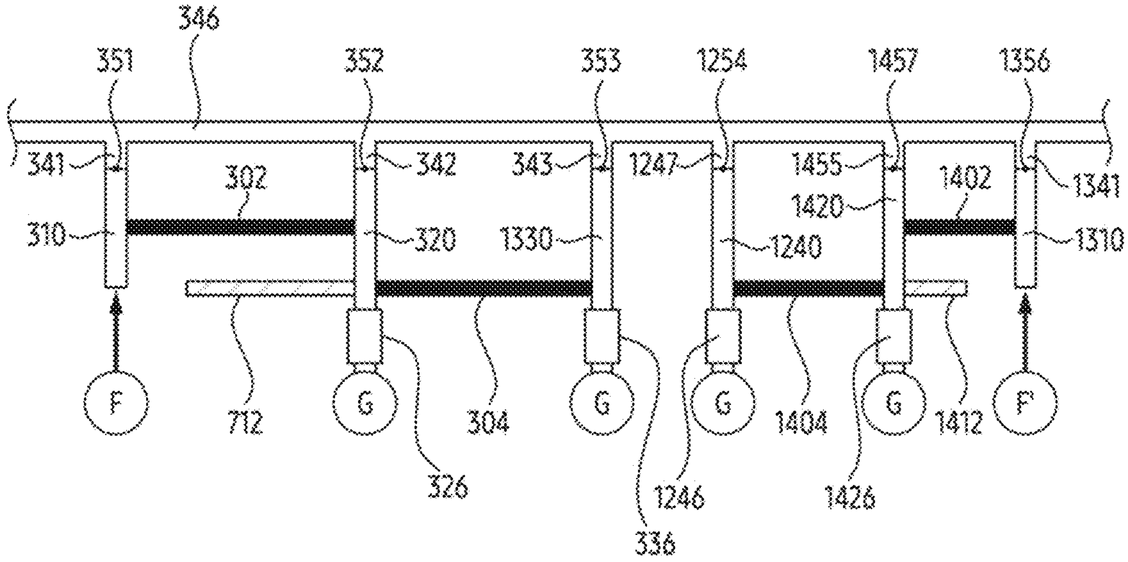
FIG. 14 illustrates an antenna structure of an example electronic device according to an embodiment.

FIG. 14 illustrates an antenna structure of an example electronic device according to an embodiment. Referring to FIG. 14, a conductive portion 340 may further include a fifth ground point 1457, according to an embodiment. In an embodiment, the fifth ground point 1457 may be formed at an end portion of a protrusion portion (or flange) 1455 extending from the side surface portion 346. In an embodiment, the fifth ground point 1457 may be located between a second feed point 1356 and a fourth ground point 1254. In an embodiment, a first feed point 351, a first ground point 352, a second ground point 353, a fourth ground point 1254, a fifth ground point 1457, and a second feed point 1356 may be located in the conductive portion 340 (for example, in that order).

In an embodiment, the fifth ground point 1457 may be electrically connected to a ground G of the electronic device. For example, the fifth ground point 1457 may be electrically connected to the ground G through a fifth ground path 1420 of a printed circuit board (e.g., the printed circuit board 350 of FIG. 12) of the electronic device. As a non-limited example, similar to the fourth ground path 1240, the fifth ground path 1420 may include a line (e.g., the line 1242 of FIG. 12) formed of a conductive material (e.g., copper) and/or a connector (e.g., the connector 1244 of FIG. 12) connected to the line.

In an embodiment, the electronic device may include a sixth conductive pattern 1402 and/or a seventh conductive pattern 1404. The sixth conductive pattern 1402 and the seventh conductive pattern 1404 may be formed of a conductive material (e.g., copper). The sixth conductive pattern 1402 and the seventh conductive pattern 1404 may be formed on the printed circuit board of the electronic device. For example, the sixth conductive pattern 1402 and the seventh conductive pattern 1404 may be formed at least partially on a surface of a substrate of the printed circuit board. In an embodiment, the sixth conductive pattern 1402 and the seventh conductive pattern 1404 may be formed on (and/or within) the fill-cut area of the printed circuit board.

In an embodiment, the sixth conductive pattern 1402 may be connected between a second feed path 1310 and the fifth ground path 1420. For example, the sixth conductive pattern 1402 may extend from a point of the second feed path 1310 to a point of the fifth ground path 1420.

In an embodiment, the seventh conductive pattern 1404 may be connected between the fourth ground path 1240 and the fifth ground path 1420. For example, the seventh conductive pattern 1404 may extend from a point of the fourth ground path 1240 to a point of the fifth ground path 1420.

According to an embodiment, the electronic device may further include a fourth matching circuit 1426 disposed on the printed circuit board. In an embodiment, the fourth matching circuit 1426 may be located in the fifth ground path 1420. For example, the fourth matching circuit 1426 may be connected between the seventh conductive pattern 1404 and a ground G.

In an embodiment, the third matching circuit 1246 located in the fourth ground path 1240 may be connected between the seventh conductive pattern 1404 and a ground G. In an embodiment, the third matching circuit 1246 and the fourth matching circuit 1426 may be configured to adjust a resonance characteristic of an antenna including the conductive portion 340, the sixth conductive pattern 1402, and the seventh conductive pattern 1404.

In an embodiment, the wireless communication circuit may supply a signal F to the conductive portion 340, the sixth conductive pattern 1402, and the seventh conductive pattern 1404 through the second feed path 1310. The signal F may be radiated through the conductive portion 340, the sixth conductive pattern 1402, and the seventh conductive pattern 1404.

Additionally, the electronic device according to an embodiment may include a fourth stub pattern 1412. In an embodiment, the fourth stub pattern 1412 may extend from the fifth ground path 1420 toward the second feed path 1310. An end portion of the fourth stub pattern 1412 may be spaced apart from the second feed path 1310. The fourth stub pattern 1412 may be formed on (and/or within) the fill-cut area of the printed circuit board. In an embodiment, the sixth conductive pattern 1402 may be located between the fourth stub pattern 1412 and the conductive portion 340, but it is not limited thereto. For example, unlike the illustration, the fourth stub pattern 1412 may be located between the sixth conductive pattern 1402 and the conductive portion 340. In an embodiment, the fourth matching circuit 1426 connected to the fifth ground path 1420 may be located between the fourth stub pattern 1412 and a ground G.

Figure 15A:
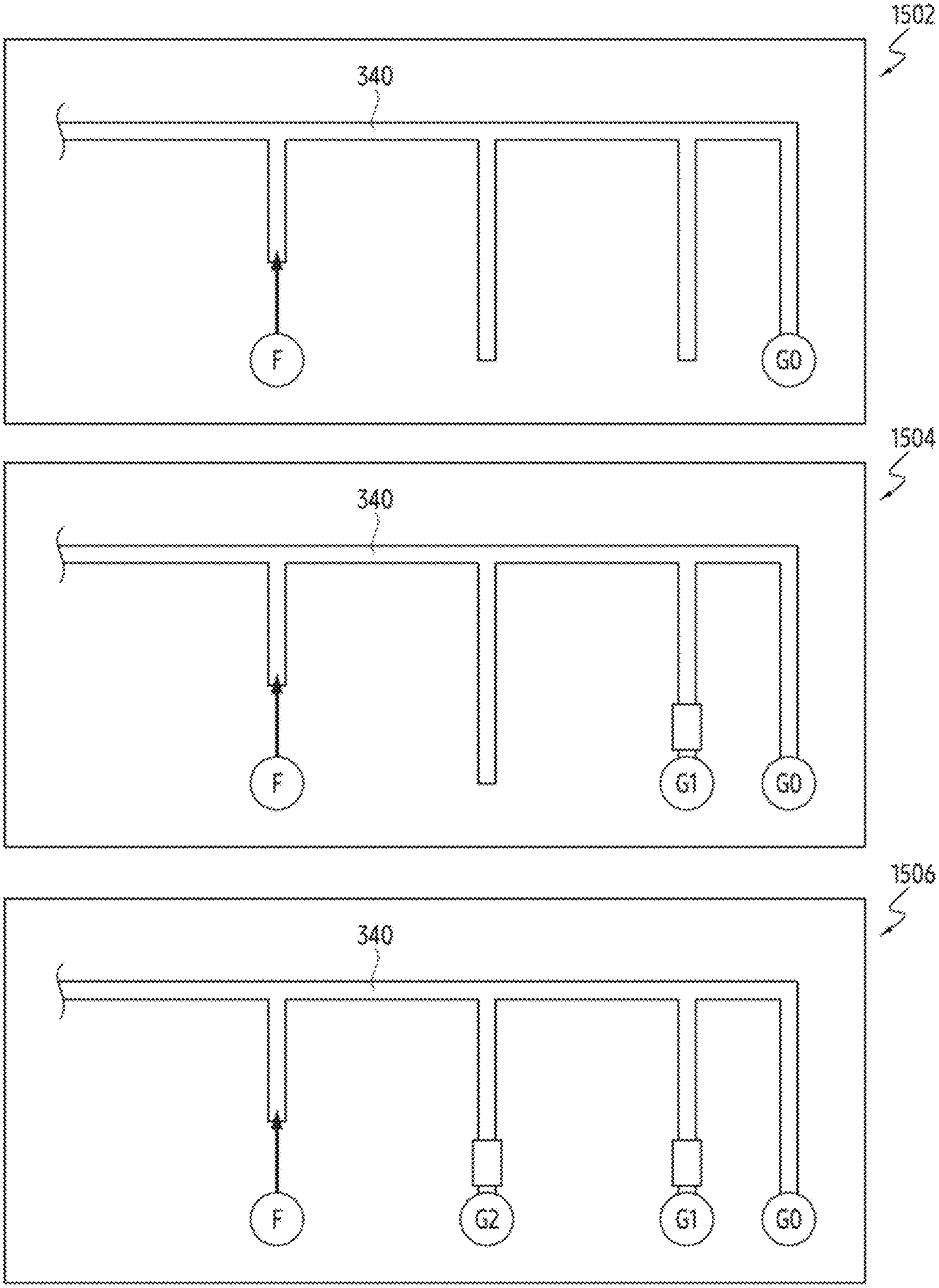
FIG. 15A illustrates examples of an antenna structure of an electronic device according to an embodiment.
Figure 15B:
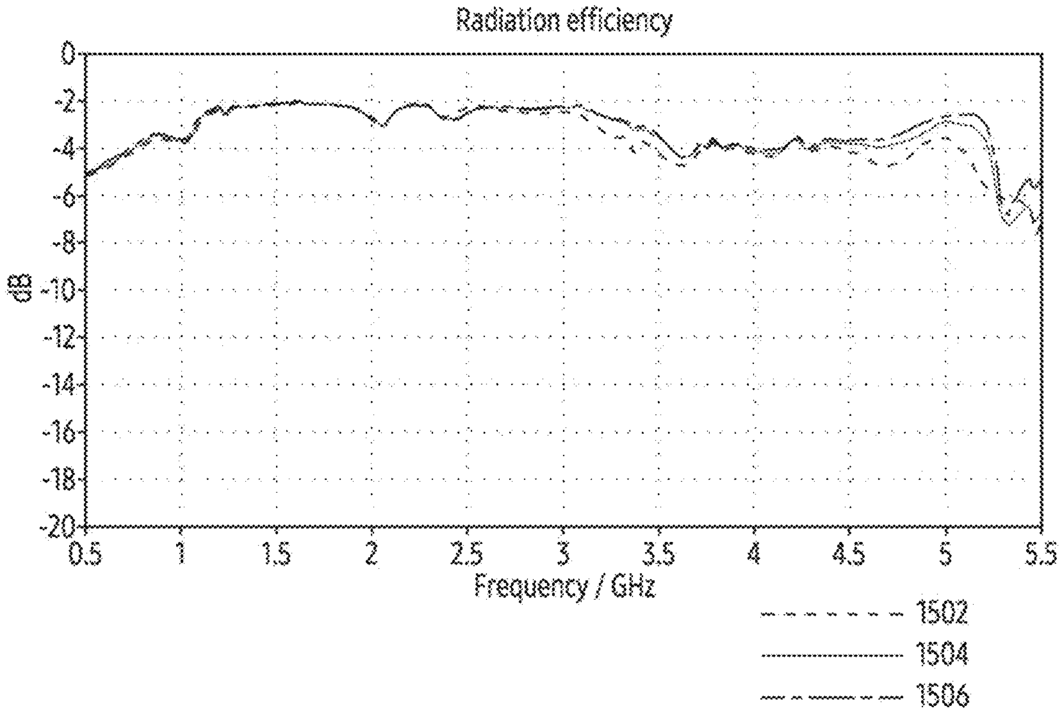
FIG. 15B illustrates radiation efficiency according to an example of an antenna structure of an electronic device according to an embodiment.
Figure 15B:
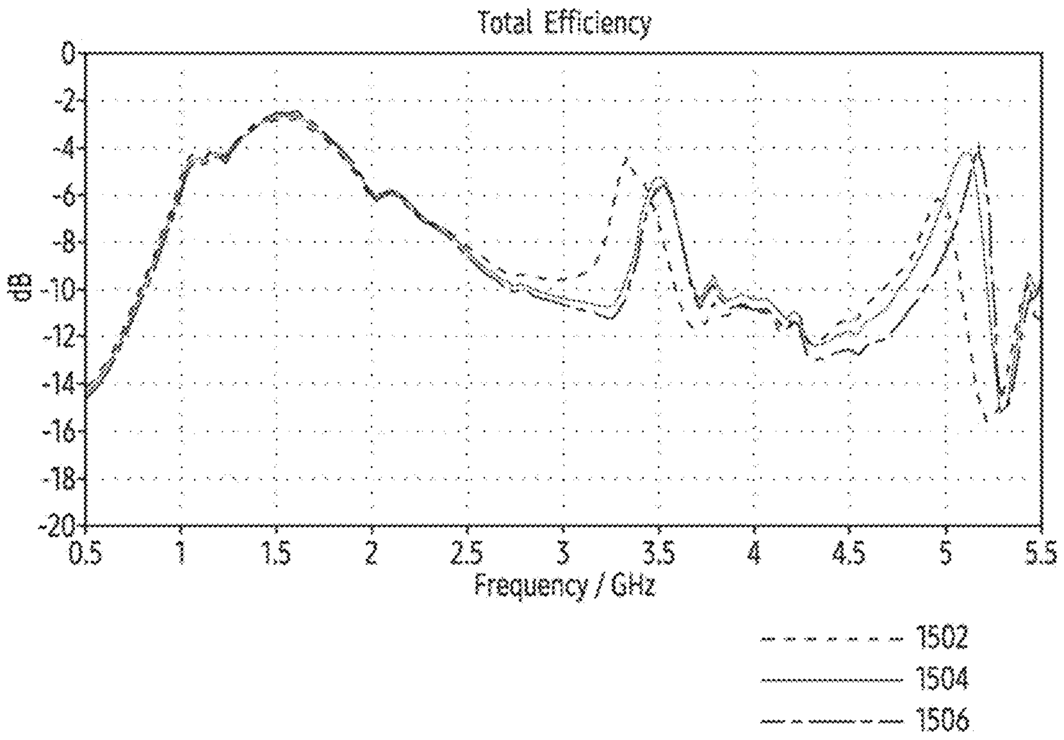

FIG. 15A illustrates examples of an antenna structure of an electronic device. FIG. 15B illustrates radiation efficiency according to an example of an antenna structure of an electronic device.

Referring to FIG. 15A, in a first example 1502, a conductive portion 340 may be connected to a ground (e.g., the ground G0) at one point. In a second example 1504, the conductive portion 340 may be connected to a ground (e.g., grounds G0 and G1) at two points. In a third example 1506, the conductive portion 340 may be connected to a ground (e.g., grounds G0, G1, and G3) at three points. The conductive portion 340 of examples 1502, 1504, and 1506 may radiate a supplied signal F.

Referring to FIG. 15B together with FIG. 15A, as the conductive portion 340 is connected to the ground (e.g., the ground G of FIG. 3) at a plurality of points (e.g., the first ground point 352, the second ground point 353, and the third ground point 354 of FIG. 3), a resonance frequency may be shifted and radiation efficiency may be improved (e.g., a band greater than or equal to about 5 GHz).

Figure 16A:
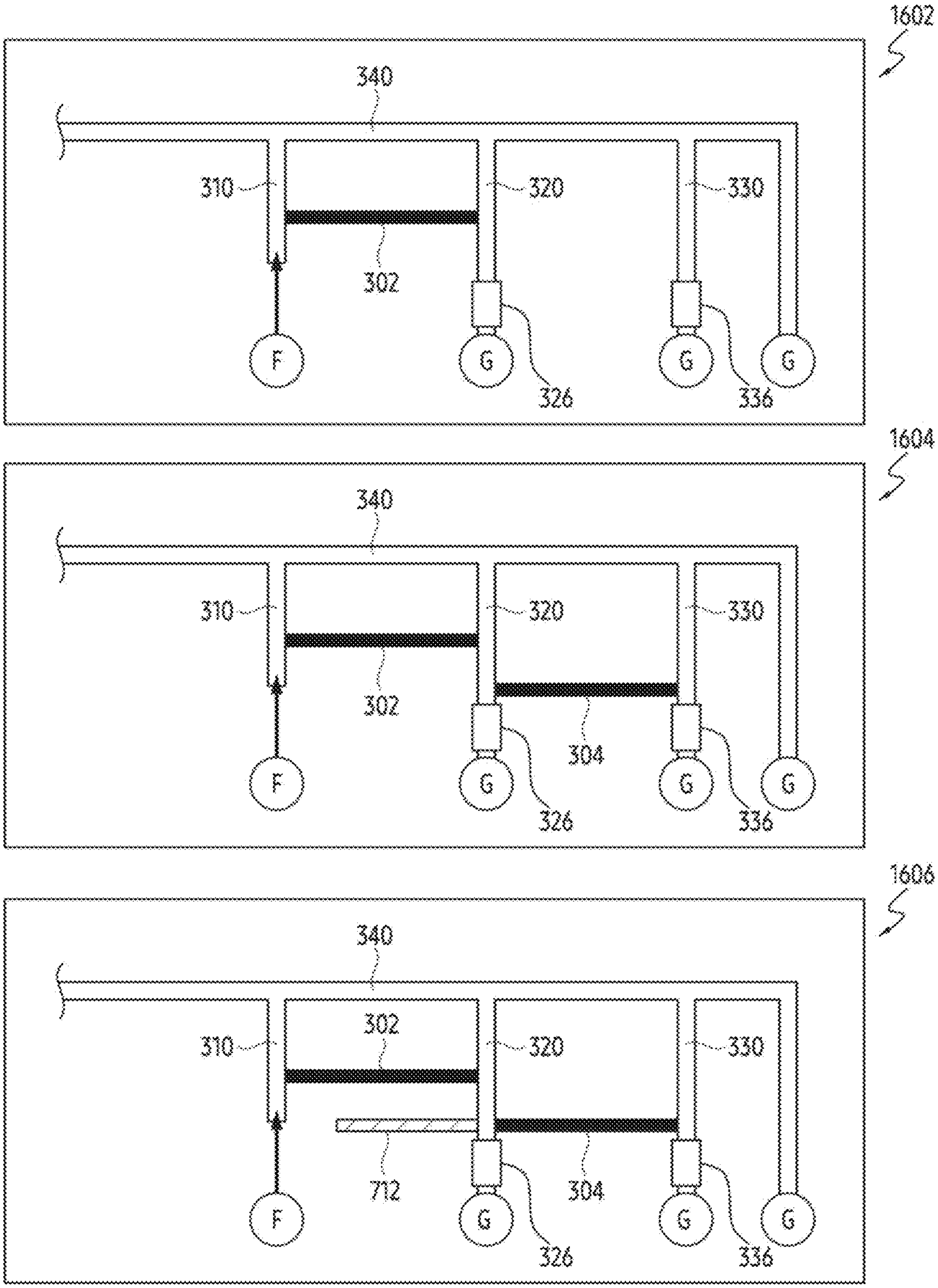
FIG. 16A illustrates examples of an antenna structure of an electronic device according to an embodiment.
Figure 16B:
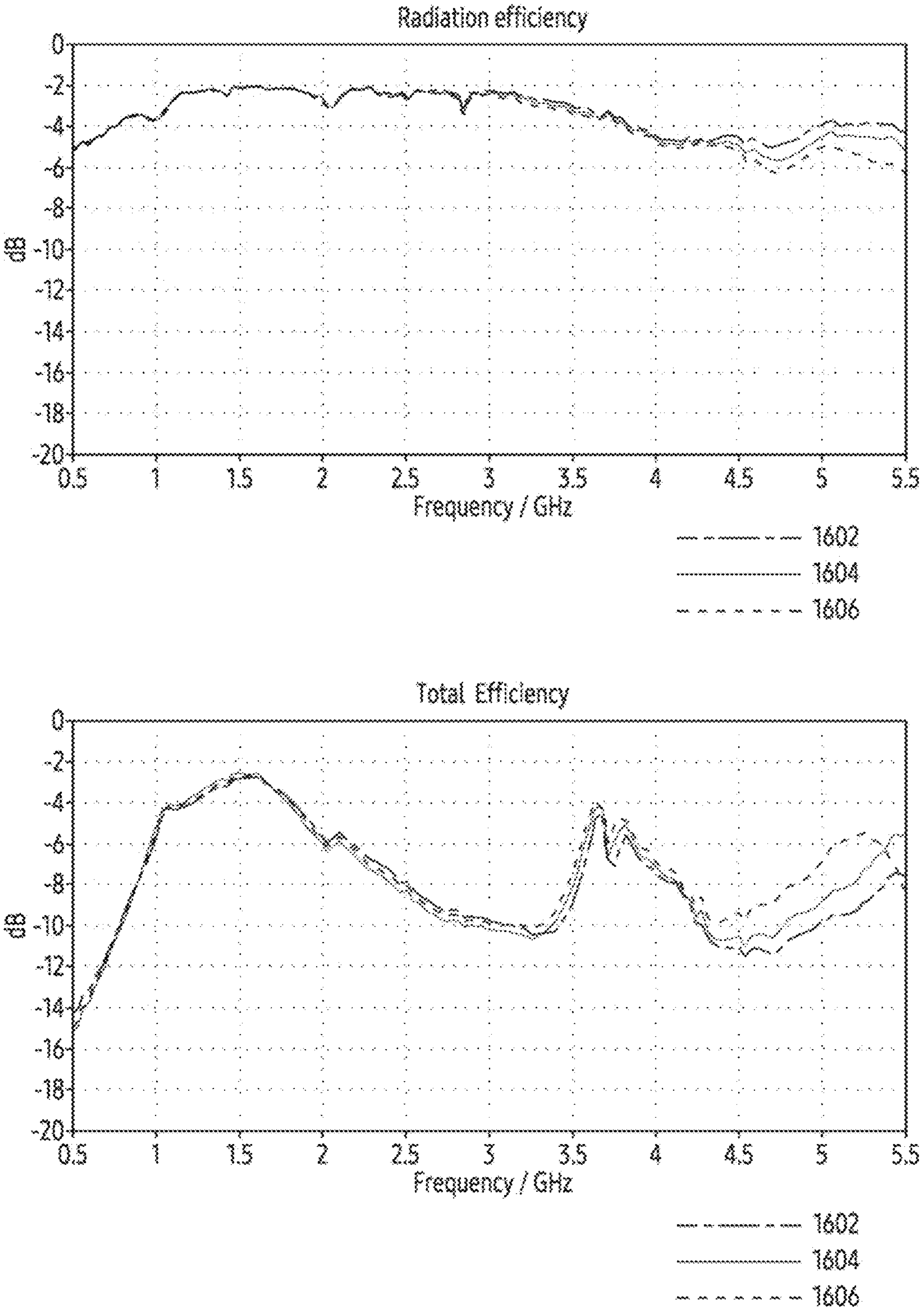
FIG. 16B illustrates radiation efficiency according to an example of an antenna structure of an electronic device according to an embodiment.
Figure 16C:
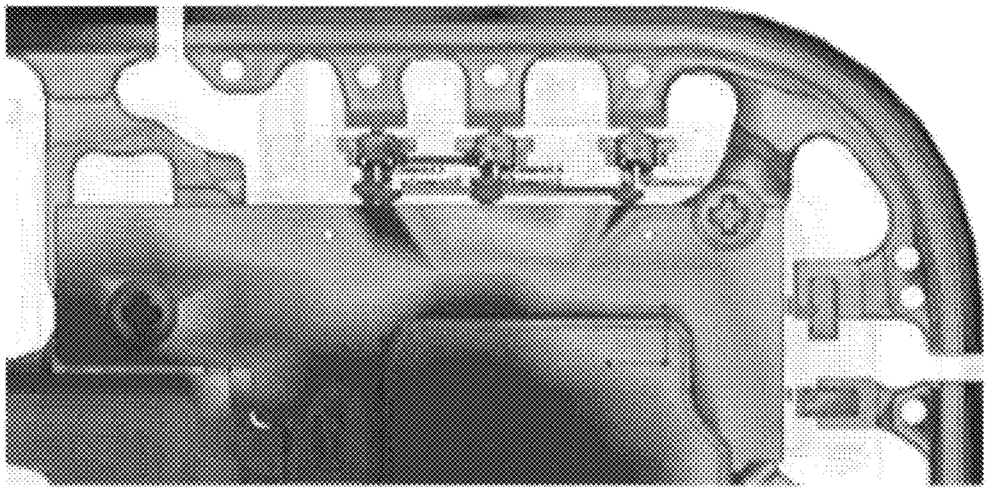
FIG. 16C illustrates an electric field of an antenna structure of an electronic device according to an embodiment.

FIG. 16A illustrates examples of an antenna structure of an electronic device according to an embodiment. FIG. 16B illustrates radiation efficiency according to an example of an antenna structure of an electronic device according to an embodiment. FIG. 16C illustrates an electric field of an antenna structure of an electronic device according to an embodiment. FIG. 16C may be an antenna structure of a third example 1606 of FIG. 16A.

Referring to FIG. 16A, in a first example 1602, a conductive portion 340 may be connected to a ground G through a first ground path 320, a second ground path 330, and the third ground path, and the first feed path 310 and the first ground path 320 may be connected through a first conductive pattern 302. The first example 1602 may further include the first conductive pattern 302 compared to the third example 1506 of FIG. 15A. The first example 1602 may be an embodiment described with reference to FIG. 3.

A second example 1604 may further include a second conductive pattern 304 connecting the first ground path 320 and the second ground path 330 compared to the first example 1602. The second example 1604 may be an embodiment described with reference to FIG. 4.

The third example 1606 may further include a first stub pattern 712 connected to the first ground path 320, compared to the second example 1604. The third example 1606 may be an embodiment in which a second stub pattern 714 and a third stub pattern 716 are omitted from an embodiment described with reference to FIG. 7.

Comparing the first example 1502 of FIG. 15B with the first example 1602 of FIG. 16B, as the first conductive pattern 302 is added, the efficiency may be improved. Comparing the first example 1602 and the second example 1604 of FIG. 16B, as the second conductive pattern 304 is added, the efficiency may be improved. Comparing the second example 1604 and the third example 1606 of FIG. 16B, as the first stub pattern 712 is added, the efficiency may be improved. This may be because, as shown in FIG. 16C, a strong current is induced in the first conductive pattern 302, the second conductive pattern 304, and the first stub pattern 712. Accordingly, not only is the efficiency improved, but the bandwidth of the operating frequency may be widened totally (e.g., a bandwidth of about 5.5 GHz band and about 5 GHz or higher band).

According to an embodiment, an antenna structure with a wideband characteristic supporting various operating frequencies may be implemented through the conductive portion 340 and a printed circuit board embedded antenna (PEA) (e.g., the first conductive pattern 302, the second conductive pattern 304, and the first stub pattern 712), without adding the number of antennas. The antenna structure, for example, may operate without interference from a legacy band, not only in the legacy frequency band (e.g., LTE frequency band) but also in a sub-6 frequency band (e.g., Frequency Range 1 band defined by the 3GPP NR standard) of 5G.

Due to the development of communication technology, new service bands such as mmWave and 5G new radio (NR) are being added. In addition, as the performance of electronic devices is improved, the size and quantity of internal components are increasing. Accordingly, although a space for implementing an antenna is reduced, greater numbers of antennas are required to support new service bands. As described above, the electronic device according to an embodiment may maximize the space utilization of the electronic device by supporting various frequency bands without adding an antenna.

Figure 17A:
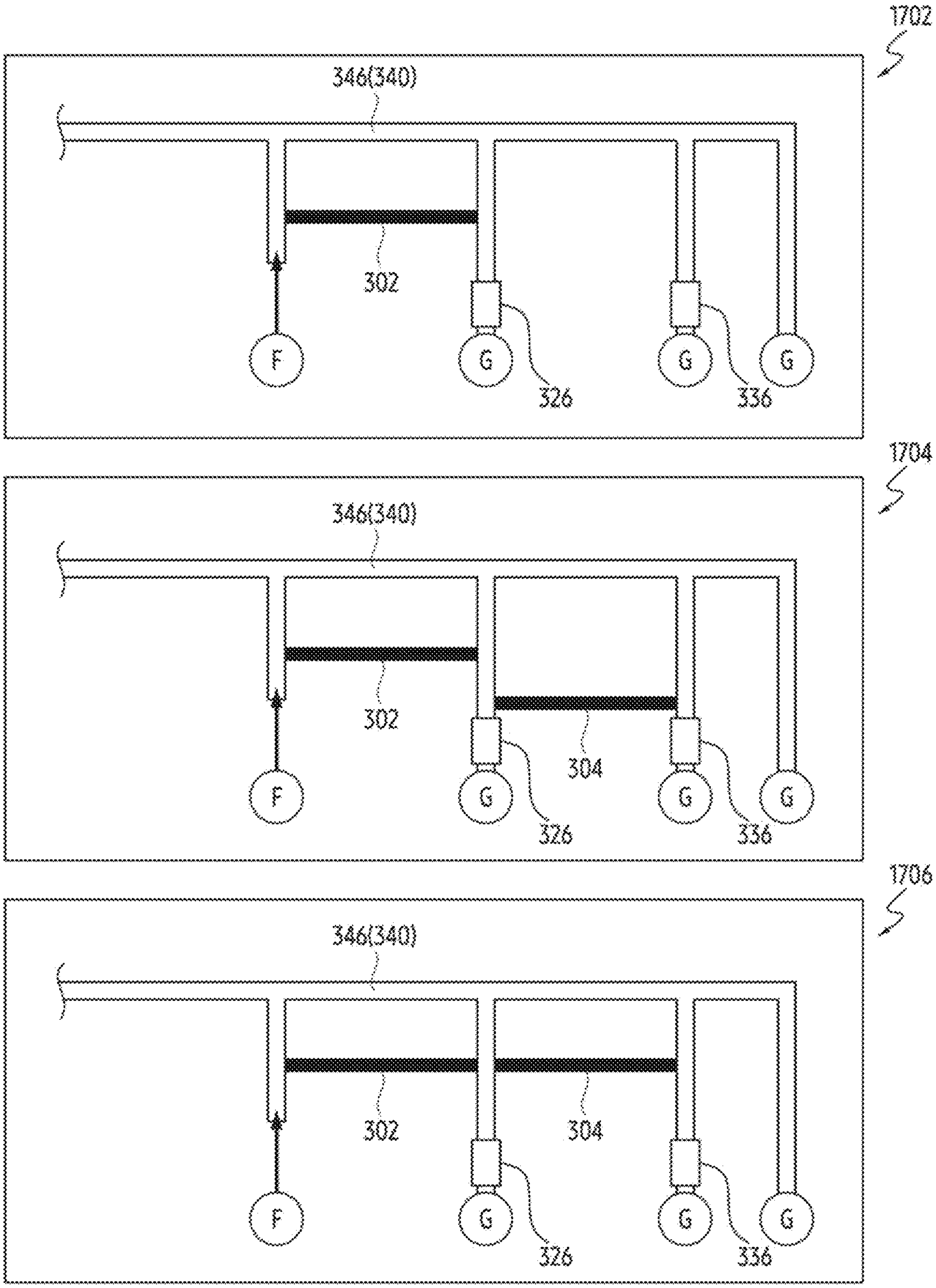
FIG. 17A illustrates examples of an antenna structure of an electronic device, according to an embodiment.
Figure 17B:
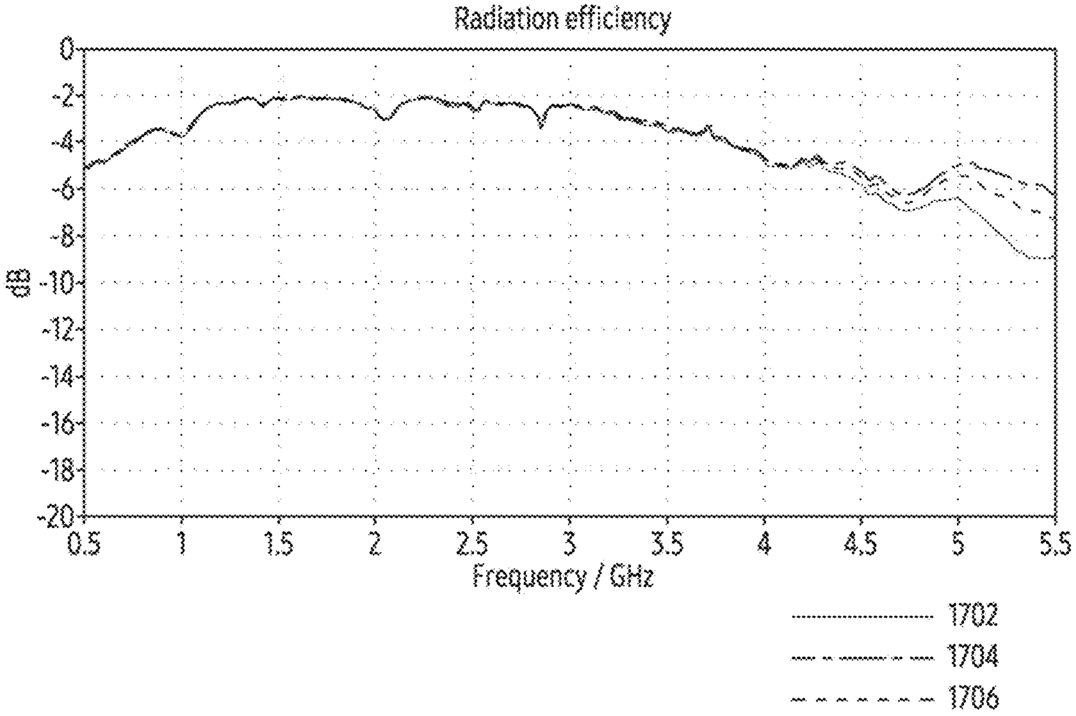
FIG. 17B illustrates radiation efficiency according to an example of an antenna structure of an electronic device according to an embodiment.
Figure 17B:
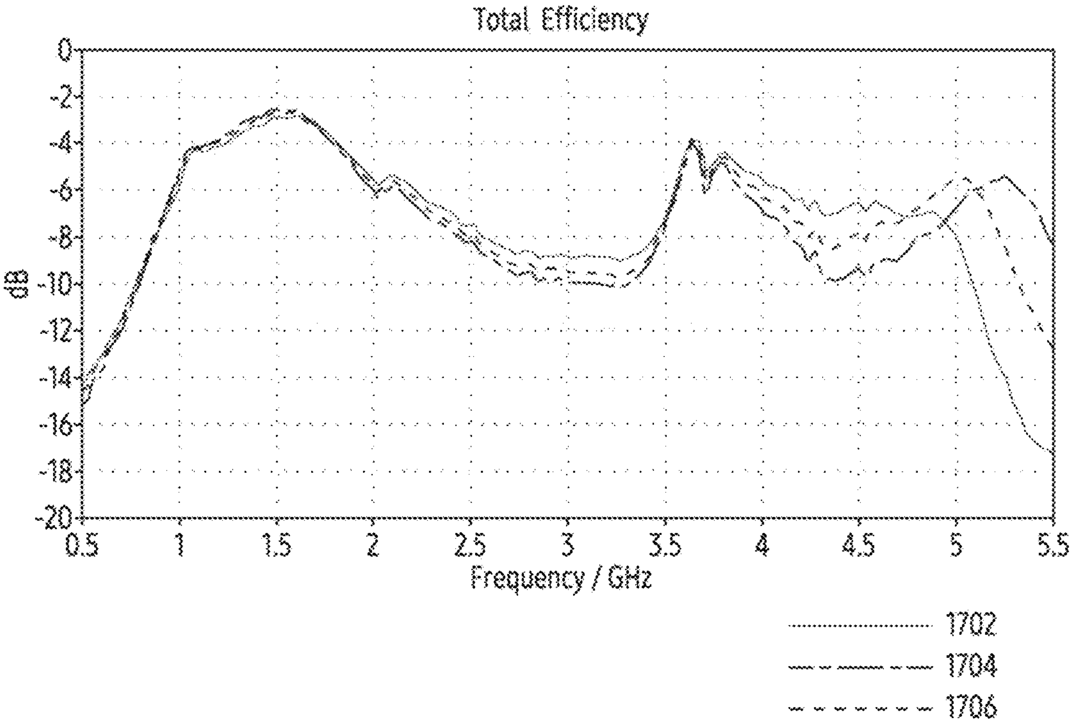

FIG. 17A illustrates examples of an antenna structure of an electronic device according to an embodiment. FIG. 17B illustrates radiation efficiency according to an example of an antenna structure of an electronic device according to an embodiment.

Referring to FIG. 17A, a first example 1702 may include a first conductive pattern 302, like as the first example 1602 of FIG. 16A. The first example 1702 may be an embodiment described with reference to FIG. 3.

A second example 1704 may further include the second conductive pattern 304 compared to the first example 1702. The second example 1704 may be an embodiment described with reference to FIG. 4. For example, the second conductive pattern 304 of the second example 1704 may be located farther from the side surface portion 346 of the conductive portion 340 than the first conductive pattern 302. For example, the first conductive pattern 302 of the second example 1704 may be spaced apart from the side surface portion 346 of the conductive portion 340 by a first distance (e.g., the first distance d1 of FIG. 4), and the second conductive pattern 304 may be spaced apart from the side surface portion 346 by a second distance (e.g., the second distance d2 of FIG. 4) greater than the first distance.

In a third example 1706, the first conductive pattern 302 and the second conductive pattern 304 may be located at substantially the same distance from the side surface portion 346 of the conductive portion 340, unlike the second example 1704. The third example 1706 may be an embodiment described with reference to FIG. 6.

Referring to FIGS. 17A and 17B, adjustment of a resonance frequency may be possible through various combinations of the first conductive pattern 302 and the second conductive pattern 304. For example, as the combination of the first conductive pattern 302 and the second conductive pattern 304 is changed in the order of the first example 1702, the third example 1706, and the second example 1704, a resonance frequency band of about 5.0 GHz may be upwardly shifted.

Figure 18A:
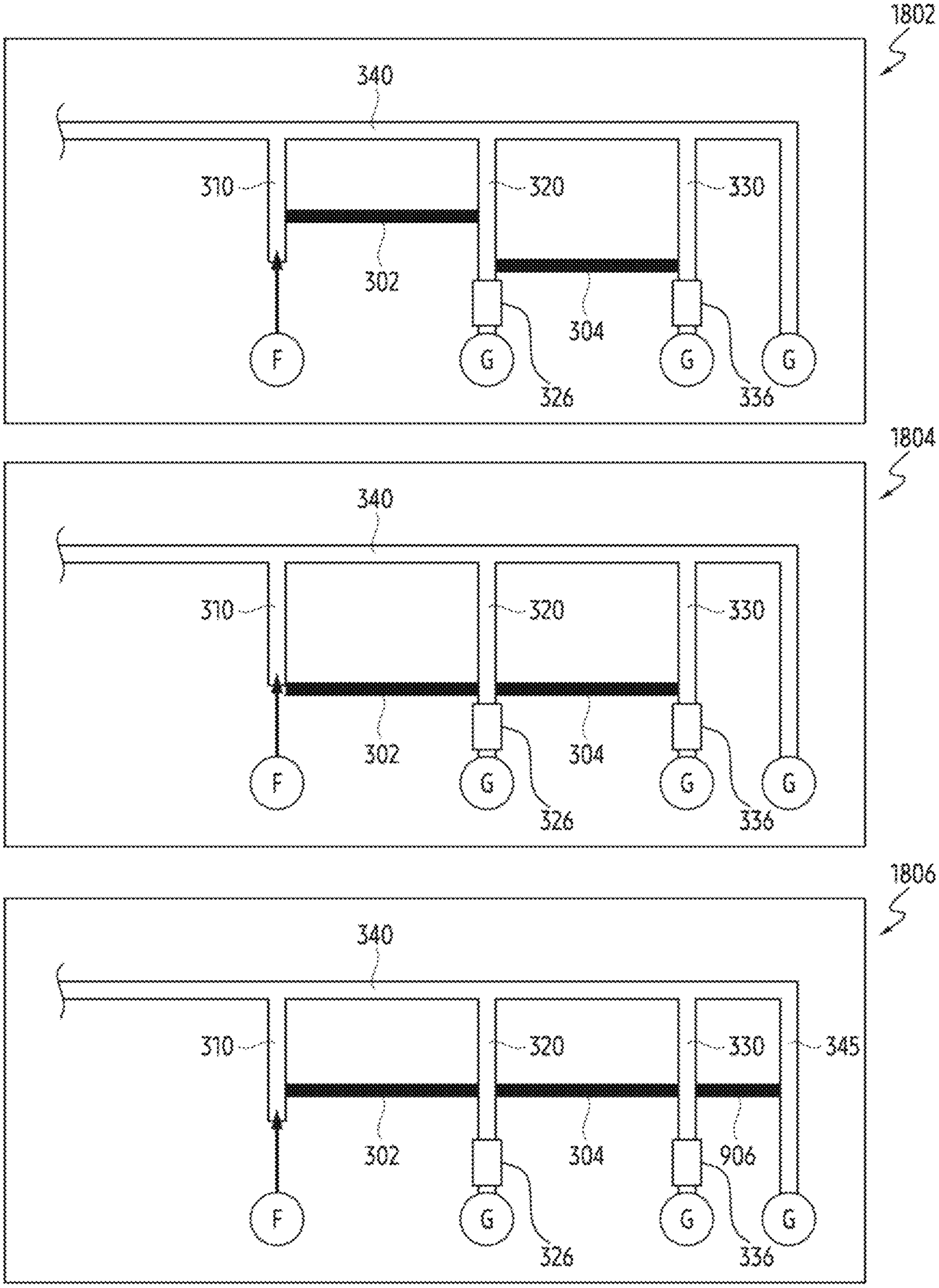
FIG. 18A illustrates examples of an antenna structure of an electronic device according to an embodiment.
Figure 18B:
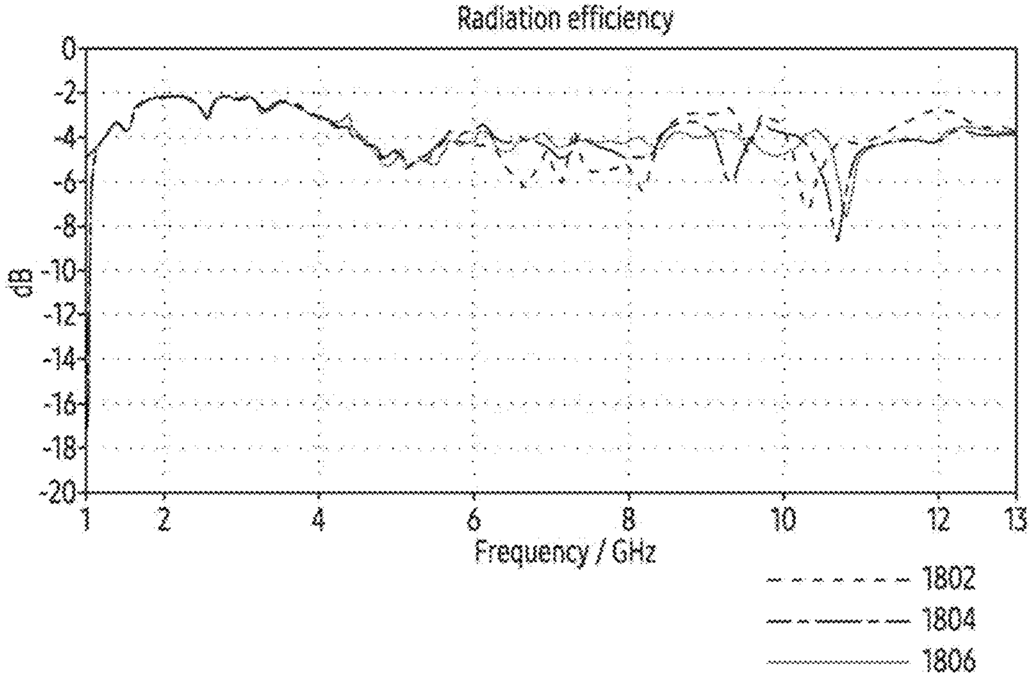
FIG. 18B illustrates radiation efficiency according to an example of an antenna structure of an electronic device according to an embodiment.
Figure 18B:
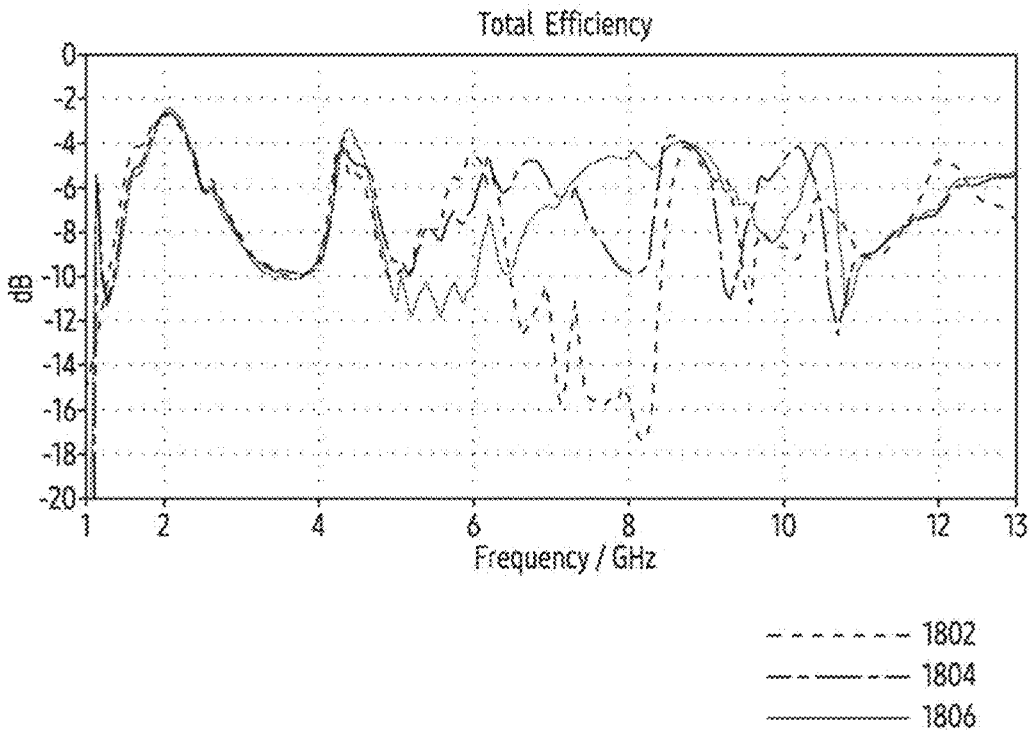

FIG. 18A illustrates examples of an antenna structure of an electronic device according to an embodiment. FIG. 18B illustrates radiation efficiency according to an example of an antenna structure of an electronic device according to an embodiment.

Referring to FIG. 18A, a first example 1802 may include the first conductive pattern 302 connecting the first feed path 310 with the first ground path 320 and the second conductive pattern 304 connecting the first ground path 320 with the second ground path 330. The first example 1802 may further include the second conductive pattern 304 compared to the first example 1702 of FIG. 17A. The first example 1802 may be an embodiment described with reference to FIG. 4.

In a second example 1804, the first conductive pattern 302 may be located further away from the conductive portion 340 compared to the first example 1802, so that the first conductive pattern 302 and the second conductive pattern 304 are aligned in parallel.

A third example 1806 may further include the third conductive pattern 906 compared to the second example 1804. The third example 1806 may be an embodiment described with reference to FIG. 9.

Referring to FIG. 18B together with FIG. 18A, the first example 1802, the second example 1804, and the third example 1806 may form a resonant frequency of about 5.0 GHz or higher. This antenna structure may operate in a 6th generation (6G) frequency band of about 5.0 GHz or higher, along with the legacy frequency band. Through this, an antenna structure operable for not only the legacy network and the 5G network, but also a next generation network such as 6G may be implemented, without increasing the number of antennas. Accordingly, a space required to implement an antenna supporting various frequencies according to various networks may be saved.

Figure 19A:
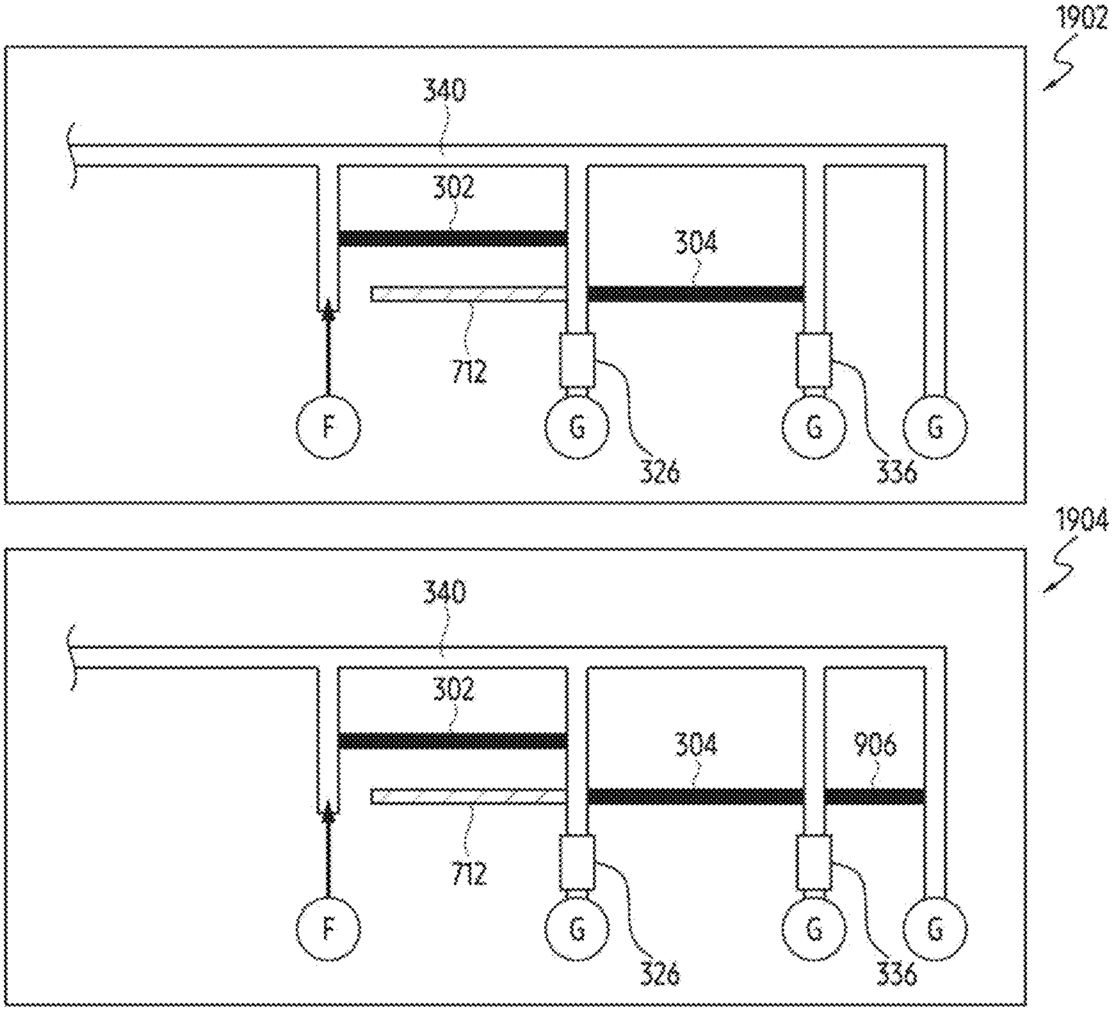
FIG. 19A illustrates examples of an antenna structure of an electronic device according to an embodiment.
Figure 19B:
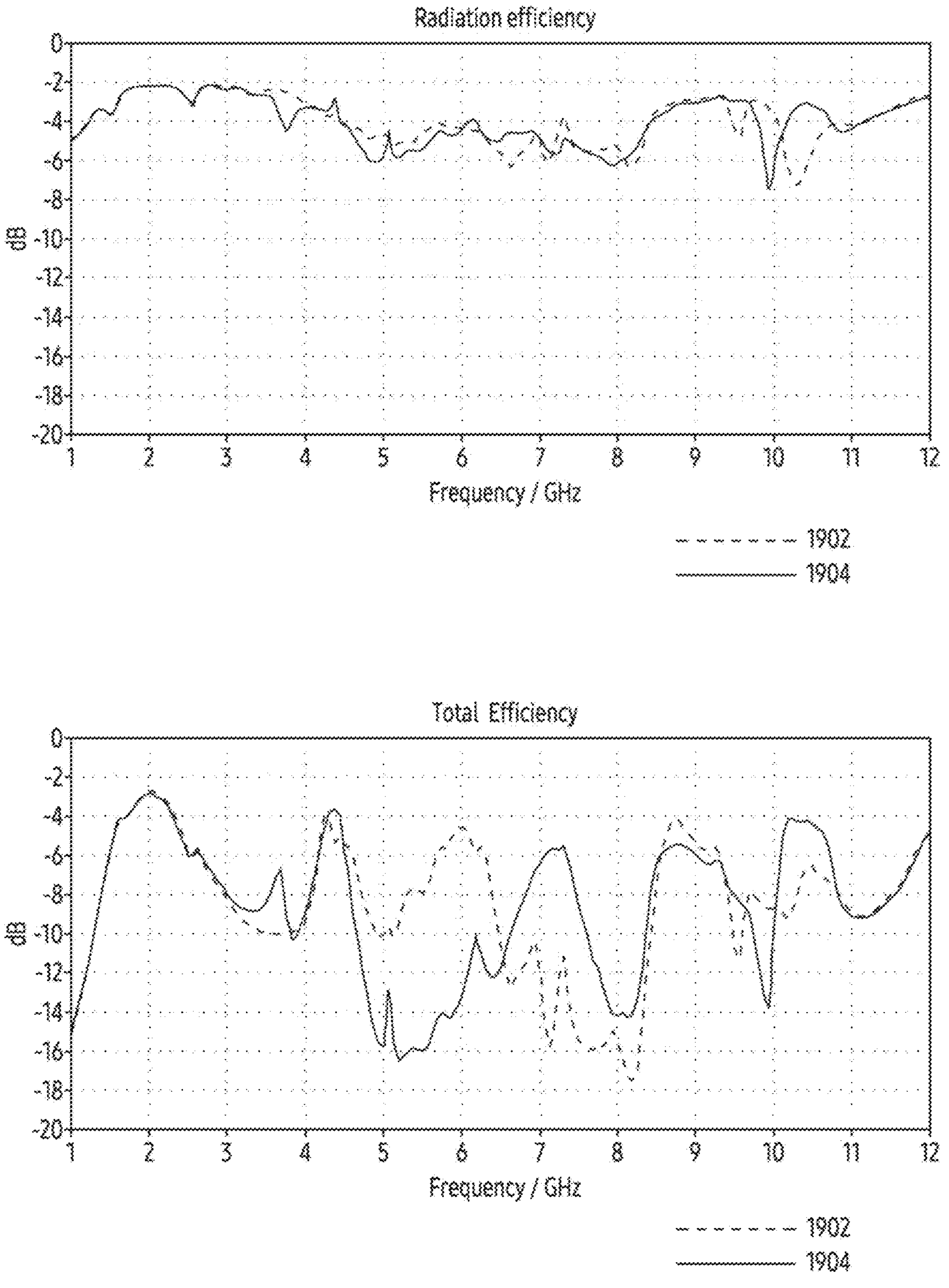
FIG. 19B illustrates radiation efficiency according to an example of an antenna structure of an electronic device according to an embodiment.

FIG. 19A illustrates examples of an antenna structure of an electronic device according to an embodiment. FIG. 19B illustrates radiation efficiency according to an example of an antenna structure of an electronic device according to an embodiment.

Referring to FIG. 19A, a first example 1902 may include the first conductive pattern 302, the second conductive pattern 304, and the first stub pattern 712. The first example 1902 may be an embodiment in which the second stub pattern 714 and the third stub pattern 716 are omitted from the embodiment described with reference to FIG. 7. A second example 1904 may further include the third conductive pattern 906, compared to the first example 1902.

Referring to FIG. 19B together with FIG. 19A, the first example 1902 may form a resonant frequency of about 6.0 GHz or higher, and the second example 1904 may form a resonant frequency of about 7.0 GHz or higher. It may be because a length of an electrical path is shortened as the third conductive pattern 906 is added.

Figure 20A:
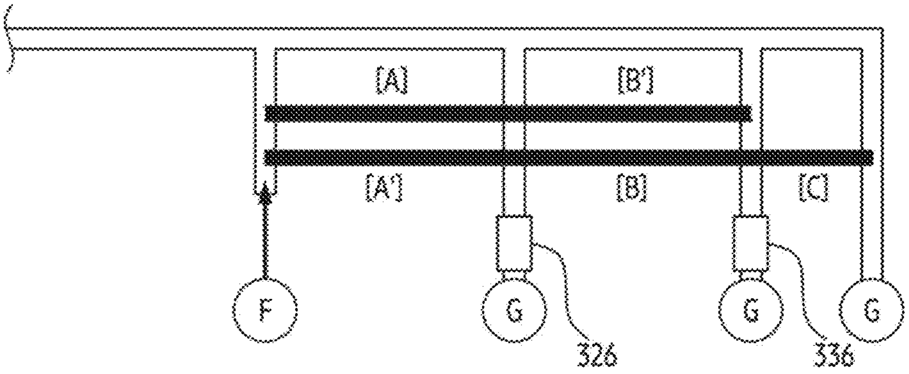
FIG. 20A illustrates examples of an antenna structure of an electronic device according to an embodiment.
Figure 20B:
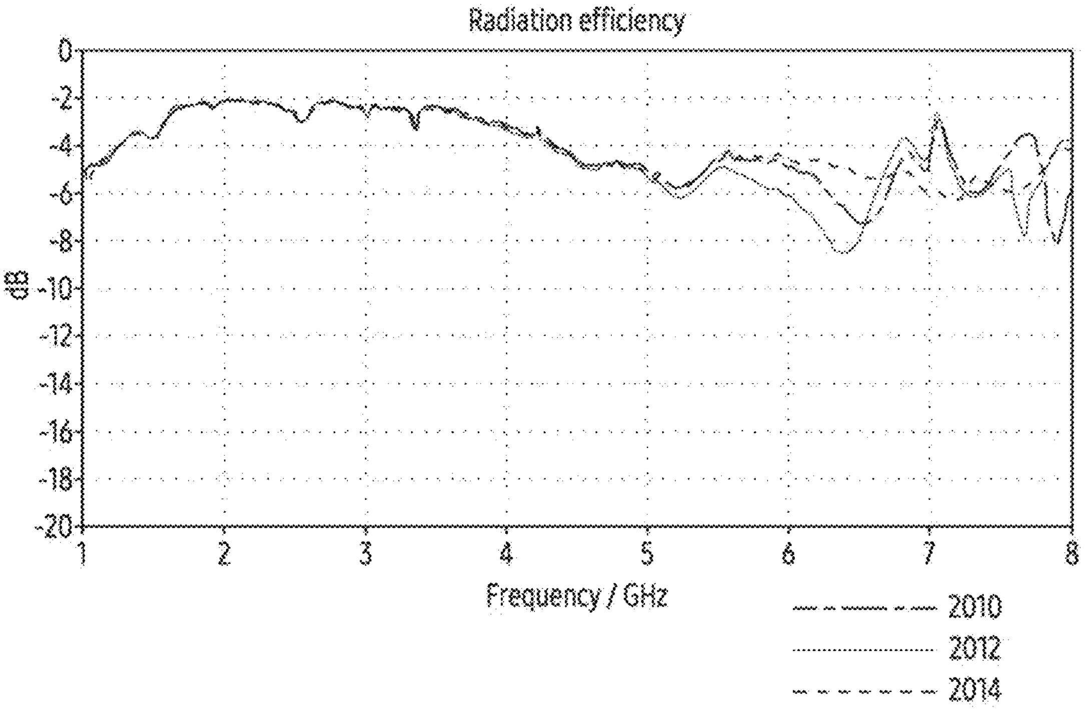
FIG. 20B illustrates radiation efficiency according to an example of an antenna structure of an electronic device according to an embodiment.
Figure 20B:
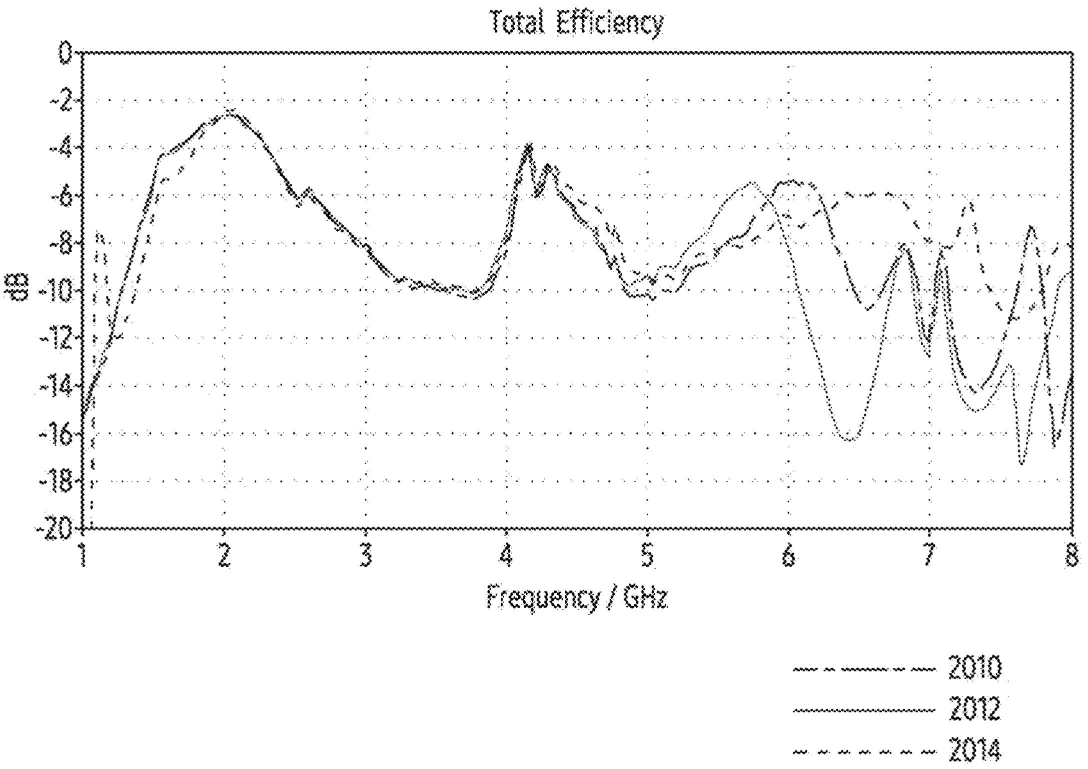

FIG. 20A illustrates examples of an antenna structure of an electronic device according to an embodiment. FIG. 20B illustrates radiation efficiency according to an example of an antenna structure of an electronic device according to an embodiment.

Referring to FIG. 20A, according to an embodiment, the electronic device may include at least one of patterns A, A', B, B', and C. In an embodiment, the patterns A and A' may be substantially the same as the first conductive pattern 302 described above. For example, in case that the electronic device includes all of the patterns A and A', it may be understood that the electronic device includes two first conductive patterns 302 spaced apart from each other.

In an embodiment, the patterns B and B' may be substantially the same as the second conductive pattern 304 described above. For example, in case that the electronic device includes all of the patterns B and B', it may be understood that the electronic device includes two second conductive patterns 304 spaced apart from each other.

In an embodiment, the pattern C may be substantially the same as the third conductive pattern 906 described above.

In an embodiment, a first example 2002 may include patterns A and B. In an embodiment, a second example 2004 may include patterns A and B'. In an embodiment, a third example 2006 may include patterns A' and B. In an embodiment, a fourth example 2008 may include patterns A' and B'. In an embodiment, a fifth example 2010 may include patterns A, B, and C. In an embodiment, a sixth example 2012 may include patterns A, B', and C. In an embodiment, a seventh example 2014 may include patterns A', B, and C. In an embodiment, an eighth example 2016 may include patterns A', B', and C. In an embodiment, a ninth example 2018 may include patterns A, A', B, B', and C.

In an embodiment, it may be possible to adjust a resonant frequency of an antenna structure through various combinations of patterns A, A', B, B', and C. For example, referring to FIGS. 20A and 20B, as the combination of conductive patterns A, A', B, B', and C is changed in the order of the sixth example 2012, the fifth example 2010, and the seventh example 2014, the resonance frequency may be upwardly shifted at a frequency of about 5.0 GHz.

According to an embodiment, an electronic device (e.g., the electronic device 100 of FIG. 1) may include a housing (e.g., the housing 110 of FIG. 2A) including a conductive portion (e.g., the conductive portion 340 of FIG. 3) forming a portion of the side surface (e.g., the side surface 100C of FIG. 1) of the electronic device, a printed circuit board (e.g., the printed circuit board 350 of FIG. 3), and a wireless communication circuit (e.g., the wireless communication module 192 of FIG. 1) disposed on the printed circuit board. The conductive portion may include a feed point (e.g., the feed point 351 of FIG. 3), a first ground point (e.g., the first ground point 352 of FIG. 3), and a second ground point (e.g., the second ground point 353 of FIG. 3). The first ground point may be connected to a ground (e.g., the ground G of FIG. 3) of the electronic device through a first ground path (e.g., the first ground path 320 of FIG. 3) of the printed circuit board. The second ground point may be connected to the ground through a second ground path (e.g., the second ground path 330 of FIG. 3) of the printed circuit board. The feed point may be electrically connected to the wireless communication circuit through a feed path (e.g., the feed path 310 of FIG. 3) of the printed circuit board. The printed circuit board may include a conductive pattern (e.g., the first conductive pattern 302 of FIG. 3) connected between the feed path and the first ground path. The wireless communication circuit may be configured to supply a signal (e.g., the signal F of FIG. 3) to the conductive portion and the conductive pattern through the feed path. The signal may be radiated through the conductive portion and the conductive pattern.

In an embodiment, the conductive pattern may be a first conductive pattern, and the printed circuit board may include a second conductive pattern (e.g., the second conductive pattern 304 of FIG. 4) connected between the first ground path and the second ground path.

In an embodiment, a point where the first conductive pattern is connected to the first ground path may be closer to the first ground point than a point where the second conductive pattern is connected to the first ground path.

In an embodiment, a point where the first conductive pattern is connected to the first ground path may be farther from the first ground point than a point where the second conductive pattern is connected to the first ground path.

In an embodiment, the first conductive pattern and the second conductive pattern may be connected to one point of the first ground path.

According to an embodiment, the electronic device may include at least one of a first switch (e.g., the first tuning circuit 882 of FIG. 8) connected to the first conductive pattern and a second switch (e.g., the second tuning circuit 884 of FIG. 8) connected to the second conductive pattern.

According to an embodiment, the electronic device may include a first matching circuit (e.g., the first matching circuit 326 of FIG. 3) connected to the first ground path and a second matching circuit (e.g., the second matching circuit 336 of FIG. 3) connected to the second ground path.

According to an embodiment, the electronic device may include at least one of a first stub (e.g., the first stub pattern 712 of FIG. 7) extending from the first ground path toward the feed path and a second stub (e.g., the second stub pattern 714 of FIG. 7) extending from the first ground path toward the second ground path.

In an embodiment, the first conductive pattern may be located between the conductive portion and the first stub. The second stub may be located between the conductive portion and the second conductive pattern.

In an embodiment, the first stub may be located between the conductive portion and the first conductive pattern. The second conductive pattern may be located between the conductive portion and the second stub.

In an embodiment, the first ground point may be located between the feed point and the second ground point.

In an embodiment, the conductive portion may include a third ground point (e.g., the third ground point 354 of FIG. 3) connected to the ground through a third ground path. The feed point, the first ground point, the second ground point, and the third ground point may be located in the conductive portion (for example, in that order).

In an embodiment, the printed circuit board may include a third conductive pattern (e.g., the third stub pattern 716 of FIG. 7 or the third conductive pattern 906 of FIG. 9) extending from the second ground path toward the third ground path.

In an embodiment, an end of the third conductive pattern may be spaced apart from the third ground path or may be connected to the third ground path.

In an embodiment, the feed point may be a first feed point, and the conductive portion may include a second feed point (e.g., the second feed point 1356 of FIG. 13) connected to the wireless communication circuit.

In an embodiment, the first ground point and the second ground point may be located between the first feed point and the second feed point.

In an embodiment, the second feed point may be connected to the wireless communication circuit through another feed path (e.g., the second feed path 1310 of FIG. 13) of the printed circuit board. The printed circuit board may include another conductive pattern (e.g., the sixth conductive pattern 1402 of FIG. 14) connected between the another feed path and a ground path adjacent to the other feed path.

According to an embodiment, an electronic device (e.g., the electronic device 100 of FIG. 1) may include a conductive portion (e.g., the conductive portion 340 of FIG. 7) including a feed point (e.g., the first feed point 351 of FIG. 7), a first ground point (e.g., the first ground point 352 of FIG. 7), a second ground point (e.g., the second ground point 353 of FIG. 7), and a third ground point (e.g., the third ground point 354) located in that order and forming a portion of a side surface (the side surface 100C of FIG. 1) of the electronic device, a printed circuit board (e.g., the printed circuit board 350 of FIG. 7) including a conductive pattern, and a wireless communication circuit (e.g., the wireless communication module 192 of FIG. 1) disposed on the printed circuit board and connected to the feed point through a feed path (e.g., the first feed path 310 of FIG. 7) of the printed circuit board. Each of the first ground point, the second ground point, and the third ground point of the conductive portion may be connected to a ground (e.g., the ground G of FIG. 7) of the electronic device. The first ground point may be connected to the ground through a first ground path (e.g., the first ground path 320 of FIG. 7) of the printed circuit board. The second ground point may be connected to the ground through a second ground path (e.g., the second ground path 330 of FIG. 7) of the printed circuit board. The conductive pattern of the printed circuit board may include a first conductive pattern (e.g., the first conductive pattern 302 of FIG. 7) located between the feed path and the first ground path, a second conductive pattern (e.g., the second conductive pattern 304 of FIG. 7), and a stub pattern (e.g., the first stub pattern 712 of FIG. 7) extending from the first ground path such that the end faces the feed path. The wireless communication circuit may be configured to supply a signal (e.g., signals F of FIG. 7) to the conductive portion and the conductive pattern through the feed path. The signal may be radiated through the conductive portion and the conductive pattern.

In an embodiment, the conductive portion may include a segment (e.g., a side surface portion 346 of FIG. 7) where the feed point, the first ground point, and the second ground point are located. The segment may include a surface (e.g., the external surface 340*c* of FIG. 7) forming the side surface of the electronic device. The stub pattern may be located farther from the surface than the first conductive pattern.

In an embodiment, the second conductive pattern may be located farther from the surface than the first conductive pattern.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

One or more embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

A method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a housing comprising a conductive portion forming a portion of a side surface of the electronic device;

a printed circuit board having a first ground path, a second ground path, and a feed path; and wireless communication circuitry disposed on the printed circuit board, wherein the conductive portion comprises a feed point, a first ground point, and a second ground point, wherein the first ground point is connected to a ground of the electronic device through the first ground path, wherein the second ground point is connected to the ground through the second ground path, wherein the feed point is electrically connected to the wireless communication circuitry through the feed path, wherein the printed circuit board comprises a conductive pattern connected between the feed path and the first ground path, and a first end of the conductive pattern is connected to the feed path and a second end of the conductive pattern is connected to the first ground path, wherein the wireless communication circuitry is configured to supply a signal, through the feed path, to the conductive portion and the conductive pattern, and wherein the signal is radiated through the conductive portion and the conductive pattern.

2. The electronic device of claim 1, wherein the conductive pattern is a first conductive pattern, and wherein the printed circuit board comprises a second conductive pattern connected between the first ground path and the second ground path.

3. The electronic device of claim 2, wherein a first point where the first conductive pattern is connected to the first ground path is closer from the first ground point than a second point where the second conductive pattern is connected to the first ground path.

4. The electronic device of claim 2, wherein a first point where the first conductive pattern is connected to the first ground path is farther to the first ground point than a second point where the second conductive pattern is connected to the first ground path.

5. The electronic device of claim 2, wherein the first conductive pattern and the second conductive pattern are connected to one point of the first ground path.

6. The electronic device of claim 2, further comprising at least one of a first switch connected to the first conductive pattern and a second switch connected to the second conductive pattern.

7. The electronic device of claim 2, further comprising at least one of a first stub extending from the first ground path toward the feed path and a second stub extending from the first ground path toward the second ground path.

8. The electronic device of claim 7, wherein the first conductive pattern is located between the conductive portion and the first stub, and wherein the second stub is located between the conductive portion and the second conductive pattern.

9. The electronic device of claim 7, wherein the first stub is located between the conductive portion and the first conductive pattern, and wherein the second conductive pattern is located between the conductive portion and the second stub.

10. The electronic device of claim 1, further comprising a first matching circuit located to the first ground path and a second matching circuit located to the second ground path.

11. The electronic device of claim 1, wherein the first ground point is located between the feed point and the second ground point.

12. The electronic device of claim 1, wherein the conductive portion comprises a third ground point connected to the ground through a third ground path, and wherein the feed point, the first ground point, the second ground point, and the third ground point are located in the conductive portion in that order.

13. The electronic device of claim 12, wherein the printed circuit board comprises a third conductive pattern extending from the second ground path toward the third ground path.

14. The electronic device of claim 13, wherein an end of the third conductive pattern is:

spaced apart from the third ground path, or connected to the third ground path.

15. The electronic device of claim 1, wherein the feed point is a first feed point, and wherein the conductive portion comprises a second feed point connected to the wireless communication circuitry.

16. The electronic device of claim 15, wherein the first ground point and the second ground point are located between the first feed point and the second feed point.

17. The electronic device of claim 16, wherein the second feed point is connected to the wireless communication circuitry through another feed path of the printed circuit board, and wherein the printed circuit board comprises another conductive pattern connected between the another feed path and a ground path adjacent to the another feed path.

18. An electronic device comprising:

a conductive portion comprising a feed point, a first ground point, a second ground point, and a third ground point located in that order, the conductive portion forming a portion of a side surface of the electronic device;

a printed circuit board comprising a conductive pattern; and wireless communication circuitry on the printed circuit board, the wireless communication circuitry being connected to the feed point through a feed path of the printed circuit board, wherein each of the first ground point, the second ground point, and the third ground point is connected to a ground of the electronic device, wherein the first ground point is connected to the ground through a first ground path of the printed circuit board, wherein the second ground point is connected to the ground through a second ground path of the printed circuit board, wherein the conductive pattern of the printed circuit board comprises:

a first conductive pattern connected between the feed path and the first ground path, wherein a first end of the first conductive pattern is connected to the feed path and a second end of the first conductive pattern is connected to the first ground path, a second conductive pattern connected between the first ground path and the second ground path, wherein a first end of the second conductive pattern is connected to the first ground path and a second end of the second conductive pattern is connected to the second ground path, and a stub pattern extending from the first ground path such that an end faces the feed path, wherein the wireless communication circuitry is configured to supply a signal, through the feed path, to the conductive portion and the conductive pattern, and wherein the signal is radiated through the conductive portion and the conductive pattern.

19. The electronic device of claim 18, wherein the conductive portion comprises a segment where the feed point, the first ground point, and the second ground point are located, wherein the segment comprises a surface being a portion of the side surface of the electronic device, and wherein the stub pattern is located farther from the surface than the first conductive pattern.

20. The electronic device of claim 19, wherein the second conductive pattern is located farther from the surface than the first conductive pattern.

* * * * *